United States Patent
Murakawa

(10) Patent No.: US 9,363,410 B2
(45) Date of Patent: Jun. 7, 2016

(54) ELECTRONIC DEVICE INCLUDING MULTIFUNCTION PERIPHERAL (MFP) HAVING COMPRESSED FILE TRANSFER UNIT FOR TRANSFERRING COMPRESSED FILE TO EXTERNAL APPARATUS AND NON-TRANSITORY STORAGE MEDIUM

(71) Applicant: KYOCERA DOCUMENT SOLUTIONS INC., Osaka-shi (JP)

(72) Inventor: Tsuyoshi Murakawa, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/383,463

(22) PCT Filed: Feb. 20, 2013

(86) PCT No.: PCT/JP2013/054234
§ 371 (c)(1),
(2) Date: Sep. 5, 2014

(87) PCT Pub. No.: WO2013/133024
PCT Pub. Date: Sep. 12, 2013

(65) Prior Publication Data
US 2015/0077789 A1    Mar. 19, 2015

(30) Foreign Application Priority Data
Mar. 7, 2012    (JP) ................. 2012-050767

(51) Int. Cl.
*G06F 3/12*     (2006.01)
*H04N 1/32*     (2006.01)
*H04L 29/08*    (2006.01)
*H04L 29/06*    (2006.01)
*H04N 1/00*     (2006.01)

(52) U.S. Cl.
CPC ............ *H04N 1/32277* (2013.01); *H04L 67/06* (2013.01); *H04L 69/04* (2013.01); *H04N 1/001* (2013.01)

(58) Field of Classification Search
None
See application file for complete search history.

(56) References Cited

U.S. PATENT DOCUMENTS 7,843,617 B2 * 11/2010 Hattori ............... H04N 1/00395
358/1.16
7,898,680 B2    3/2011 Misawa et al.
(Continued)

FOREIGN PATENT DOCUMENTS

CN    1741563 A    3/2006
CN    101101478 A   1/2008
(Continued)

OTHER PUBLICATIONS

Extended European Search Report dated Oct. 7, 2015 in corresponding EP Application No. 13757651.8.
(Continued)

*Primary Examiner* — Steven Kau
(74) *Attorney, Agent, or Firm* — Knobbe Martens Olson & Bear LLP

(57) ABSTRACT

An MFP 20 of the present invention includes: a Box region 43*a* that stores a plurality of pieces of data; a Swap region 43*b* that is used for a work; a transfer request accepting unit 40*a* that accepts a request of transfer of the plurality of pieces of data; a compressed file generating unit 40*b*; and a compressed file transferring unit 40*i*. The compressed file generating unit 40*b*, in a case in which the request is accepted by the transfer request accepting unit 40*a*, generates the compressed file that stores the plurality of pieces of data on the Box region 43*a*. The compressed file transferring unit 40*i* transfers the compressed file generated by the compressed file generating unit 40*b* to an external PC 50.

6 Claims, 21 Drawing Sheets

(56) References Cited

U.S. PATENT DOCUMENTS

| | | | |
|---|---|---|---|
| 2002/0056010 A1 | 5/2002 | Lincoln et al. | |
| 2004/0146206 A1* | 7/2004 | Matsubara | H04N 19/70 382/232 |
| 2006/0044601 A1* | 3/2006 | Misawa | G06F 3/122 358/1.15 |
| 2007/0229922 A1 | 10/2007 | Hattori | |

FOREIGN PATENT DOCUMENTS

| | | |
|---|---|---|
| JP | 2002-108635 A | 4/2002 |
| JP | 2003-067277 A | 3/2003 |
| JP | 2003-216925 A | 7/2003 |
| JP | 2005-011119 A | 1/2005 |
| JP | 2007-086860 A | 4/2007 |
| JP | 2008-090490 A | 4/2008 |
| JP | 2011-188371 A | 9/2011 |
| WO | 2008/155523 A2 | 12/2008 |

OTHER PUBLICATIONS

Shoji Kasahara, "Internet no Arukikata", Unix User, Jun. 1, 1995, vol. 4, No. 6, pp. 132 to 137.

Office Action for Chinese Patent Application No. 201380012492.X dated Apr. 18, 2016.

* cited by examiner

US 9,363,410 B2

ELECTRONIC DEVICE INCLUDING MULTIFUNCTION PERIPHERAL (MFP) HAVING COMPRESSED FILE TRANSFER UNIT FOR TRANSFERRING COMPRESSED FILE TO EXTERNAL APPARATUS AND NON-TRANSITORY STORAGE MEDIUM

CROSS-REFERENCE TO RELATED APPLICATIONS

This application is the U.S. National Phase under 35. U.S.C. §371 of International Application PCT/JP2013/054234, filed Feb. 20, 2013, which claims priority to Japanese Patent Application No. 2012-050767, filed Mar. 7, 2012. The disclosures of the above-described applications are hereby incorporated by reference in their entirety. The International Application was published under PCT Article 21(2) in a language other than English.

TECHNICAL FIELD

The present invention relates to an electronic device that compresses a file and transfers to an external device.

BACKGROUND ART

Conventionally, an electronic device that compresses and divides a file and then transfers the divided files to an external device has been known (refer to Patent Documents 1 to 3).
Patent Document 1: Japanese Unexamined Patent Application Publication No. 2002-108635
Patent Document 2: Japanese Unexamined Patent Application Publication No. 2003-067277
Patent Document 3: Japanese Unexamined Patent Application Publication No. 2005-011119

DISCLOSURE OF THE INVENTION

Problems to be Solved by the Invention

However, in the conventional electronic device that divides a file and transfers to an external device, there is a problem that a plurality of exchanges of communication is required between the electronic device and the external device for transfer of a file to the external device.

Given this, the present invention is aimed at providing an electronic device that can transfer a plurality of files to an external device by a single exchange of communication with the external device.

Means for Solving the Problems

An electronic device of the present invention includes: a data storing unit that stores a plurality of pieces of data; a working storing unit that is used for a work; a transfer request accepting unit that accepts a request of transfer of the plurality of pieces of data; a compressed file generating unit; and a compressed file transferring unit. The compressed file generating unit that, in a case in which the request is accepted by the transfer request accepting unit, generates a compressed file that stores the plurality of pieces of data on the data storing unit. The compressed file transferring unit transfers the compressed file generated by the compressed file generating unit to an external device. The compressed file generating unit includes: a converted file generating unit; an original data deleting unit; a file compressing unit; and an upon-compression converted file deleting unit. The converted file generating unit converts one of the plurality of pieces of data on the data storing unit by lossless compression, to thereby generate a converted file on the working storing unit. The original data deleting unit deletes the data, which is an unconverted copy of the converted file generated by the converted file generating unit, from the data storing unit. The file compressing unit, after the data is deleted by the original data deleting unit, compresses the converted file on the working storing unit by lossless compression and stores in the compressed file on the data storing unit. The upon-compression converted file deleting unit deletes the converted file, which has been stored in the compressed file by the file compressing unit, from the working storing unit. In a case in which the converted file is not present in the working storing unit, the converted file generating unit generates the converted file in the working storing unit.

A non-transitory storage medium of the present invention is a computer-readable non-transitory storage medium that stores a file compression and transfer program.

PREFERRED MODE FOR CARRYING OUT THE INVENTION

Figure 1:
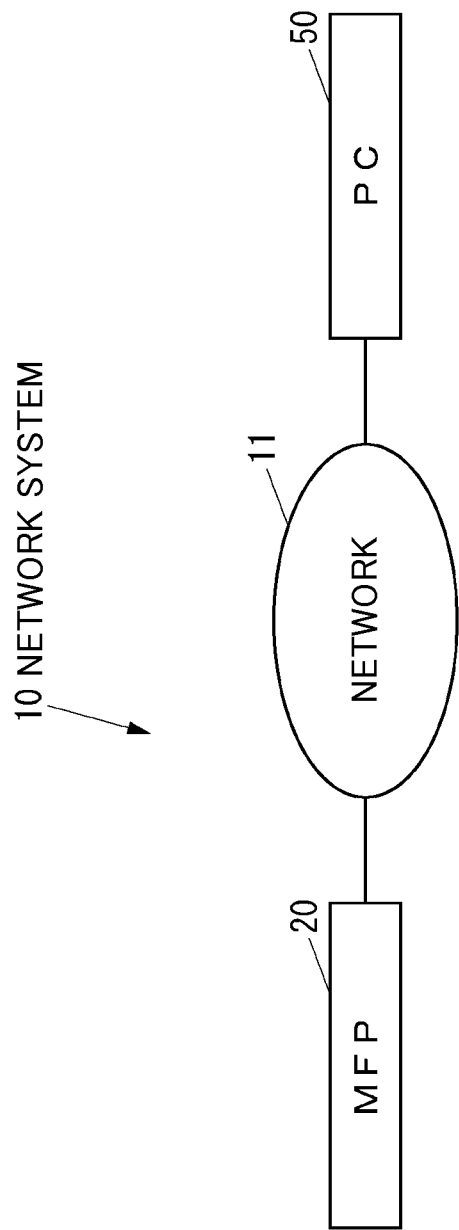
FIG. 1 is a block diagram of a network system according to an embodiment of the present invention.

An embodiment of the present invention is described hereinafter with reference to the drawings. First, a configuration of a network system according to the present embodiment is described. FIG. 1 is a block diagram of a network system 10 according to the present embodiment.

As shown in FIG. 1, the network system 10 is provided with a MFP (Multi Function Peripheral) 20 as the electronic device of the present invention, and a PC (Personal Computer) 50 which is a device outside of the MFP 20. The MFP 20 and the PC 50 are connected communicatively with each other via a network 11 such as a LAN (Local Area Network).

Figure 2:
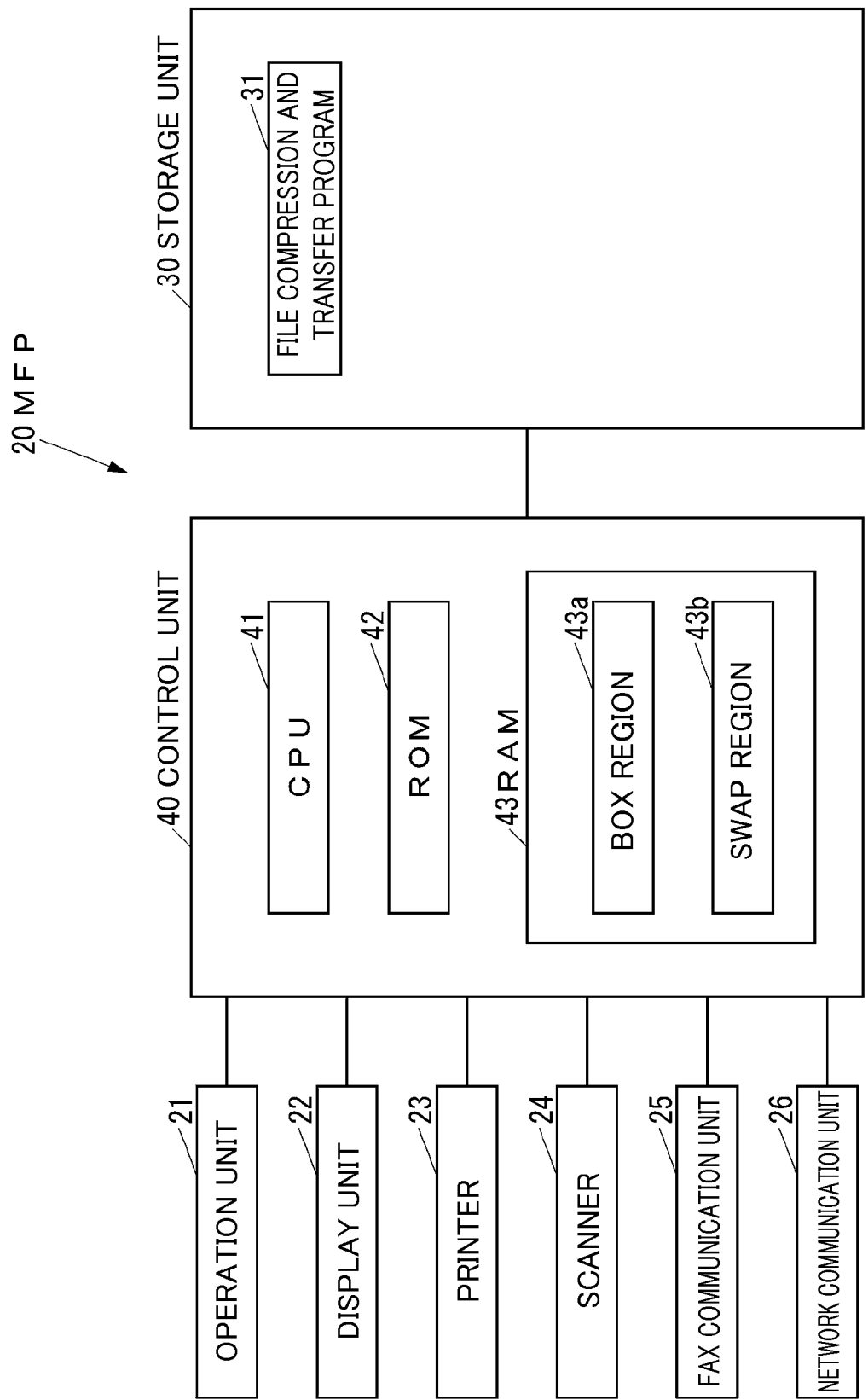
FIG. 2 is a block diagram of a MFP shown in FIG. 1.

FIG. 2 is a block diagram of the MFP 20. As shown in FIG. 2, the MFP 20 includes an operation unit 21, a display unit 22, a printer 23, a scanner 24, a fax communication unit 25, a network communication unit 26, a storage unit 30, and a control unit 40. The operation unit 21 is an input device such as a button through which various operations by a user are input. The display unit 22 is a display device such as an LCD (Liquid Crystal Display) that displays various kinds of information. The printer 23 is a printing device that executes printing of an image onto a printing medium such as paper. The scanner 24 is a scanning device that scans an image from an original. The fax communication unit 25 is a fax device that performs fax communication via a communication line such as a public telephone network. The network communication unit 26 is a network communication device that performs communication via the network 11. The storage unit 30 is a storage device such as EEPROM (Electrically Erasable Programmable Read Only Memory) that stores various data. The control unit 40 controls the entire MFP 20.

The storage unit 30 stores a file compression and transfer program 31 that compresses a file and transfers to an external device.

The file compression and transfer program 31 can be: installed to the MFP 20 during a manufacture process of the MFP 20; installed additionally to the MFP 20 from a storage medium such as USB (Universal Serial Bus) memory and an SD memory card; or installed additionally to the MFP 20 via the network 11.

The control unit 40 is provided with a CPU (Central Processing Unit) 41, ROM (Read Only Memory) 42 that stores a program and various data in advance, and RAM (Random Access Memory) 43 that is used as a working area for the CPU 41. The CPU 41 executes a program stored in the ROM 42 or the storage unit 30.

Figure 3:
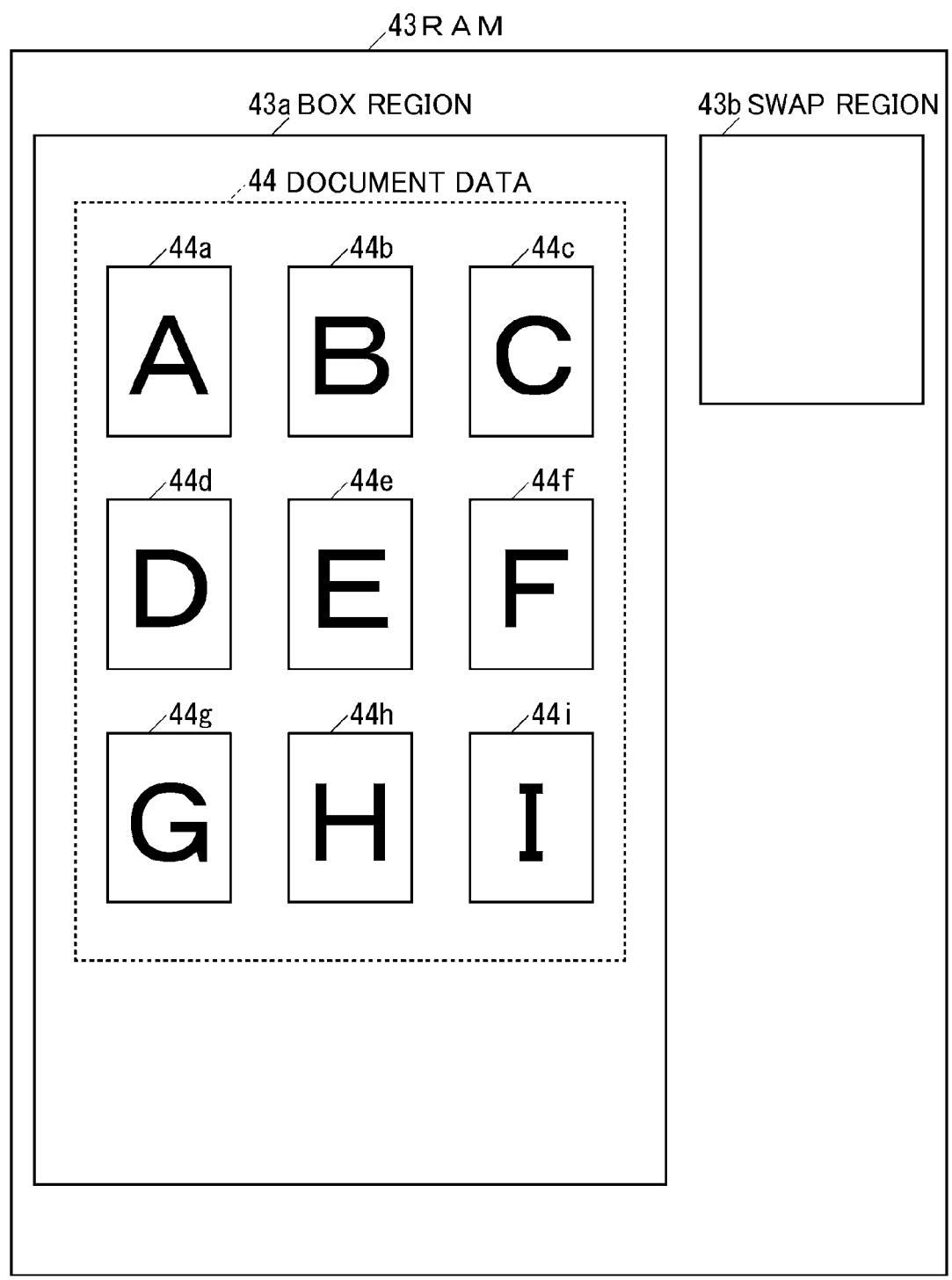
FIG. 3 is a diagram illustrating a status of RAM shown in FIG. 2 in a case in which a plurality of pieces of data constituting a piece of document data is stored on a Box region.

FIG. 3 is a diagram illustrating a status of the RAM 43 in a case in which a plurality of pieces of data 44a to 44i constituting a piece of document data 44 is stored on a Box region 43a.

As shown in FIG. 3, the RAM 43 can store the Box region 43a as the data storing unit storing the plurality of pieces of data 44a to 44i, and a Swap region 43b as the working storing unit used for a work. The plurality of pieces of data 44a to 44i composes the piece of document data 44. The plurality of pieces of data 44a to 44i is image data composing respective pages in the document data 44. The pieces of data 44a to 44i are not in a data format to be submitted to an external device such as the PC 50.

Figure 4:
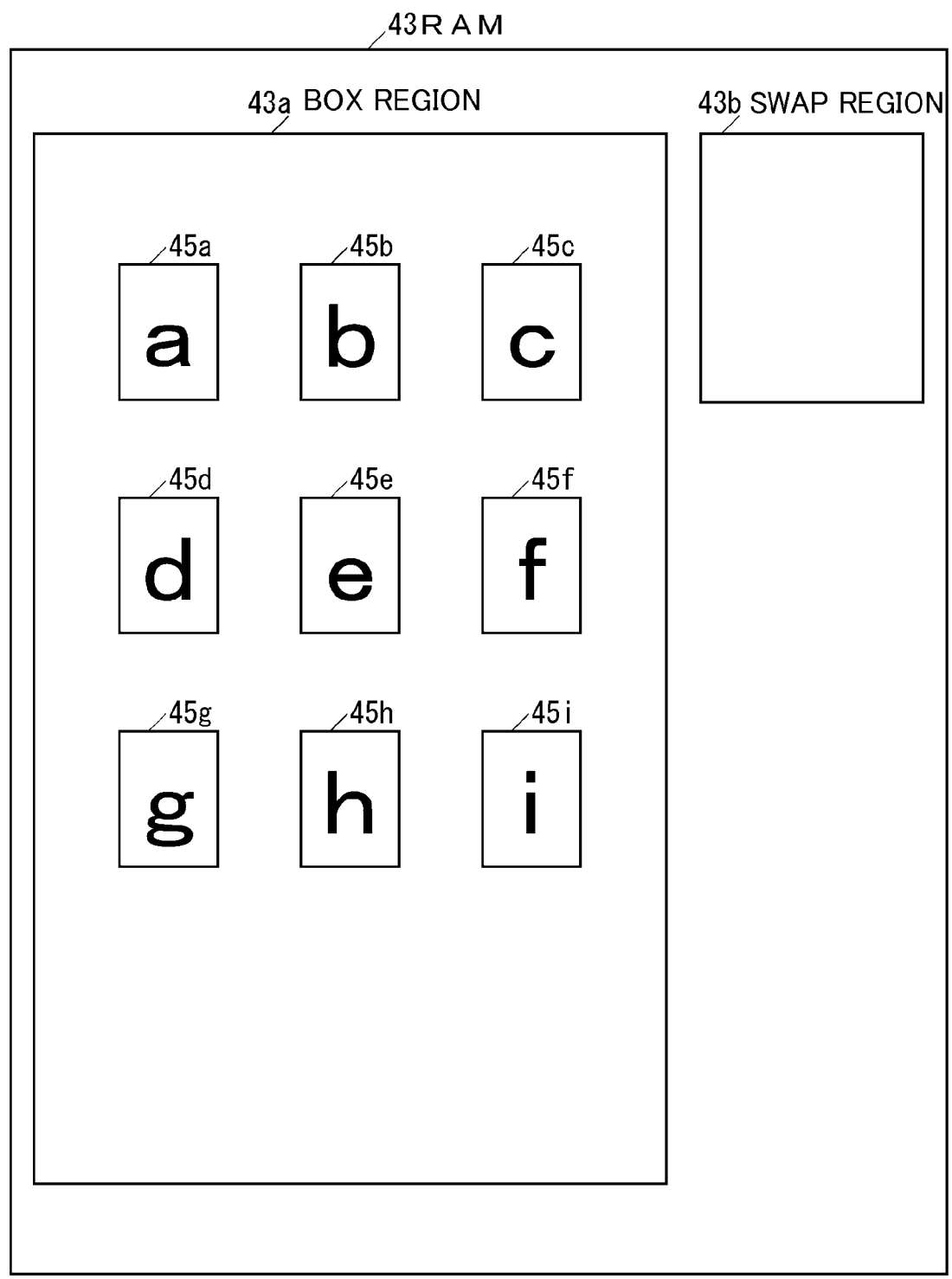
FIG. 4 is a diagram illustrating a status of the RAM shown in FIG. 2 in a case in which a converted file is stored on the Box region.

FIG. 4 is a diagram illustrating a status of the RAM 43 in a case in which converted files 45a to 45i, which are generated by converting the plurality of pieces of data 44a to 44i of the document data 44 by lossless compression, are stored on the Box region 43a.

As shown in FIG. 4, the converted files 45a to 45i can be stored on the Box region 43a of the RAM 43. The converted files 45a to 45i are generated by converting the pieces of data 44a to 44i of the document data 44 by lossless compression such as TIFF (Tagged Image File Format) and PDF (Portable Document Format). The converted files 45a to 45i are in a data format to be submitted to an external device such as the PC 50. The converted files 45a to 45i are compressed and therefore smaller in size than the pieces of data 44a to 44i before compression, respectively.

Figure 5:
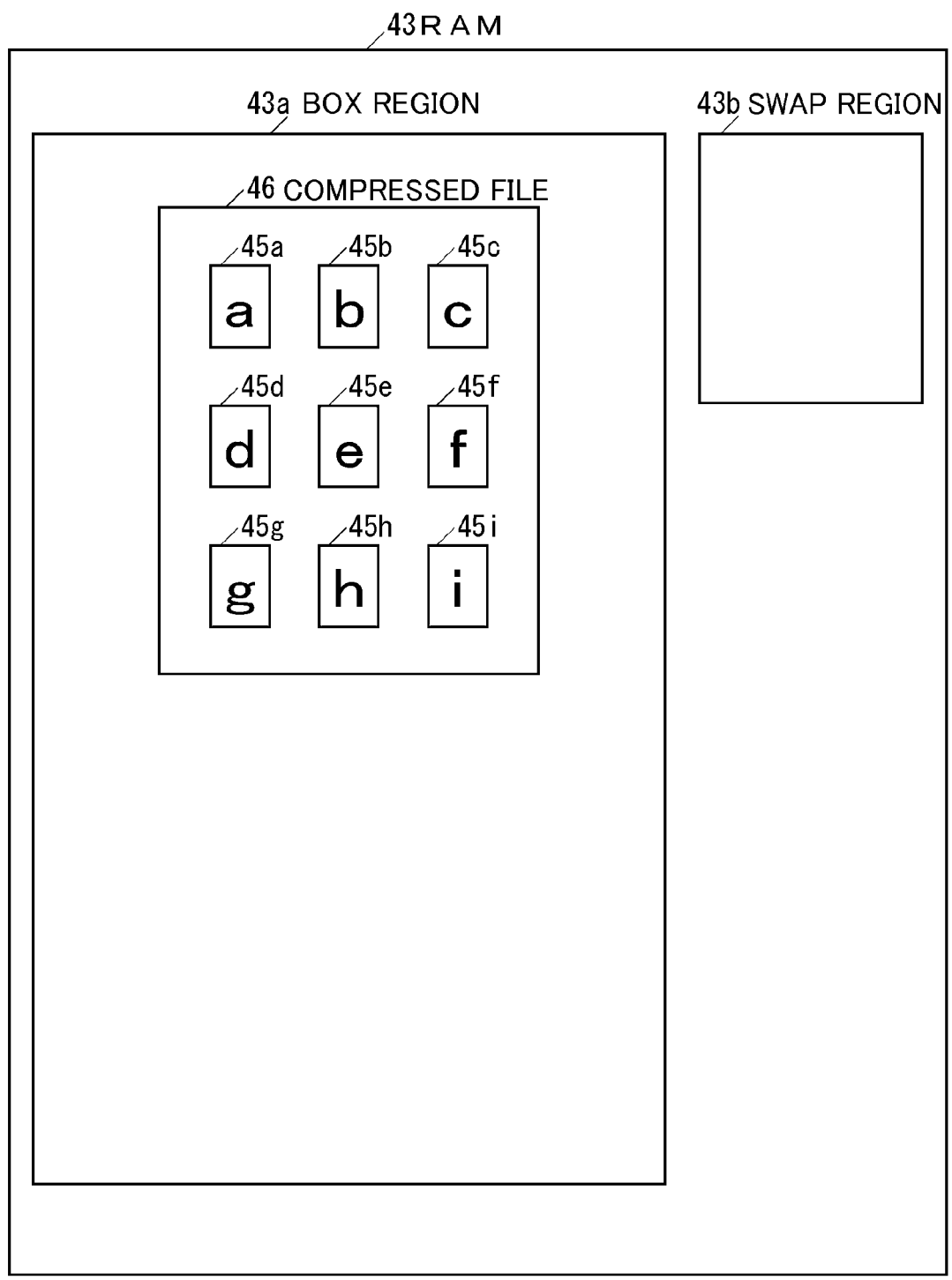
FIG. 5 is a diagram illustrating a status of the RAM shown in FIG. 2 in a case in which a compressed file is stored on the Box region.

FIG. 5 is a diagram illustrating a status of the RAM 43 in a case in which a compressed file 46, in which the converted files 45a to 45i are compressed by lossless compression and stored, is stored on the Box region 43a.

As shown in FIG. 5, the compressed file 46 can be stored in Box region 43a of the RAM 43. The compressed file 46 is generated by compressing, by lossless compression for example ZIP, and storing the converted files 45a to 45i. The compressed file 46 is compressed and therefore smaller in size than a total size of the converted files 45a to 45i before compression.

Figure 6:
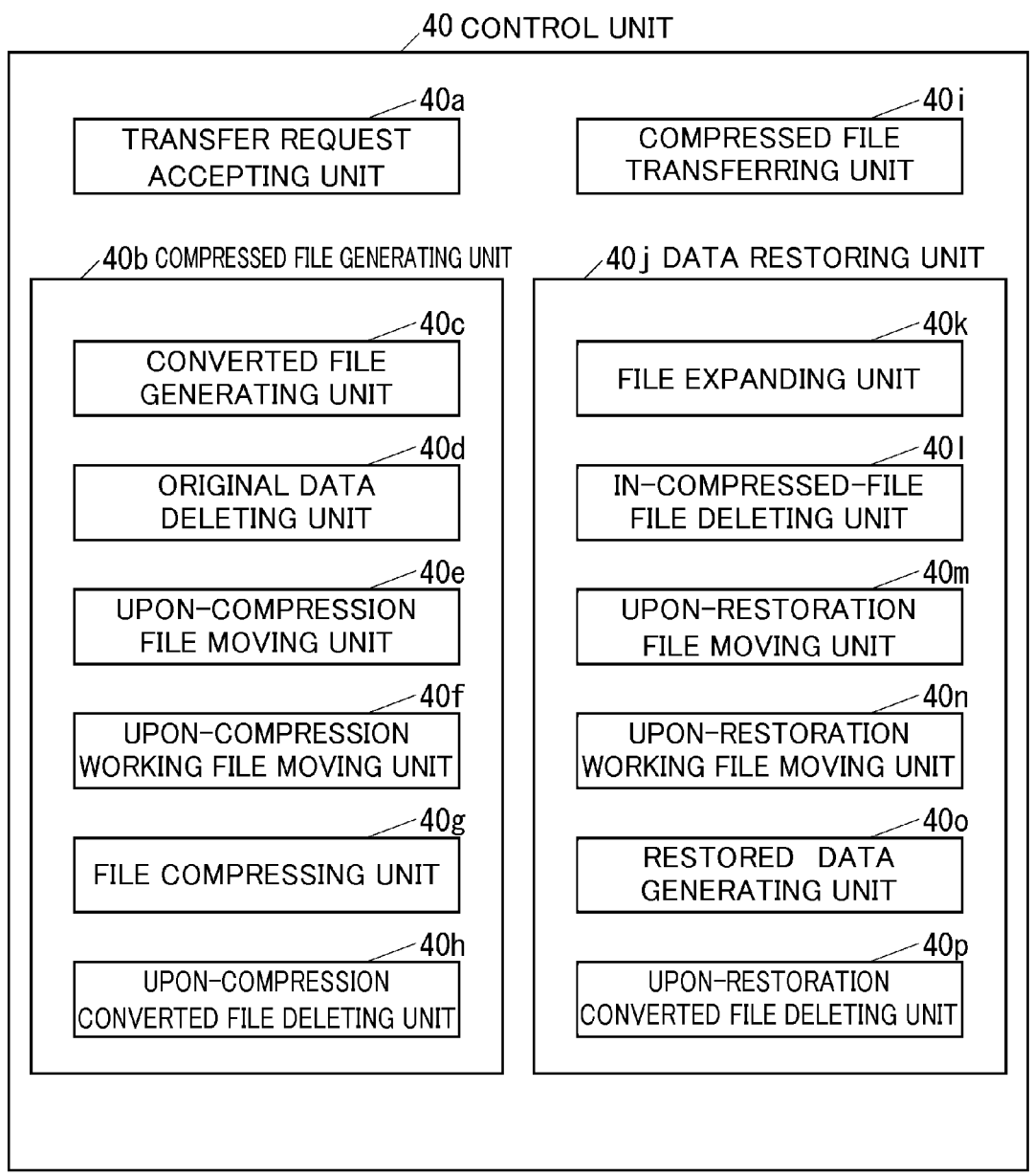
FIG. 6 is a diagram illustrating a function of a control unit shown in FIG. 2.

FIG. 6 is a diagram illustrating a function of the control unit 40. As shown in FIG. 6, the control unit 40 functions as a transfer request accepting unit 40a, a compressed file generating unit 40b, a compressed file transferring unit 40i, and a data restoring unit 40j, by executing the file compression and transfer program 31 stored in the storage unit 30. The transfer request accepting unit 40a accepts a request of transfer of the document data 44. The compressed file generating unit 40b, in a case in which a request is accepted by the transfer request accepting unit 40a, generates the compressed file 46 that stores the document data 44 on the Box region 43a. The compressed file transferring unit 40i transfers the compressed file 46 generated by the compressed file generating unit 40b to an external device. The data restoring unit 40j restores the document data 44 from the compressed file 46 on the Box region 43a in a case in which the compressed file 46 is transferred to the external device by the compressed file transferring unit 40i. In other words, the MFP 20 constitutes the computer of the present invention that executes the file compression and transfer program 31.

The compressed file generating unit 40b is provided with a converted file generating unit 40c, an original data deleting unit 40d, an upon-compression file moving unit 40e, an upon-compression working file moving unit 40f, a file compressing unit 40g, and an upon-compression converted file deleting unit 40h. The converted file generating unit 40c converts one of the plurality of pieces of data of the document data 44 on the Box region 43a by lossless compression, to thereby generate a converted file on the Swap region 43b. The original data deleting unit 40d deletes the data, which is an unconverted copy of the converted file generated by the converted file generating unit 40c, from the Box region 43a. The upon-compression file moving unit 40e moves the converted file on the Swap region 43b to the Box region 43a. The upon-compression working file moving unit 40f moves the converted file of one of the document data 44 on the Box region 43a to the Swap region 43b. The file compressing unit 40g compresses the converted file on the Swap region 43*b* by lossless compression and stores in the compressed file 46 on the Box region 43*a*. The upon-compression converted file deleting unit 40*h* that deletes the converted file, which is stored in the compressed file 46 by the file compressing unit 40*g*, from the Swap region 43*b*.

The data restoring unit 40*j* is provided with a file expanding unit 40*k*, an in-compressed-file file deleting unit 40*l* (40L), an upon-restoration file moving unit 40*m*, an upon-restoration working file moving unit 40*n*, a restored data generating unit 40*o*, and an upon-restoration converted file deleting unit 40*p*. The file expanding unit 40*k* expands, from the compressed file 46 on the Box region 43*a*, the converted file of one of the document data 44 to the Swap region 43*b*. The file deleting unit 40*l* deletes the converted file that has been expanded by the file expanding unit 40*k* from the compressed file 46. The upon-restoration file moving unit 40*m* moves the converted file on the Swap region 43*b* to the Box region 43*a*. The upon-restoration working file moving unit 40*n* moves the converted file of one of the document data 44 on the Box region 43*a* to the Swap region 43*b*. The restored data generating unit 40*o* restores the converted file on the Swap region 43*b* to thereby generate data on the Box region 43*a*. The upon-restoration converted file deleting unit 40*p* deletes the converted file, which is an unrestored copy of the data generated by the restored data generating unit 40*o*, from the Swap region 43*b*.

Figure 7:
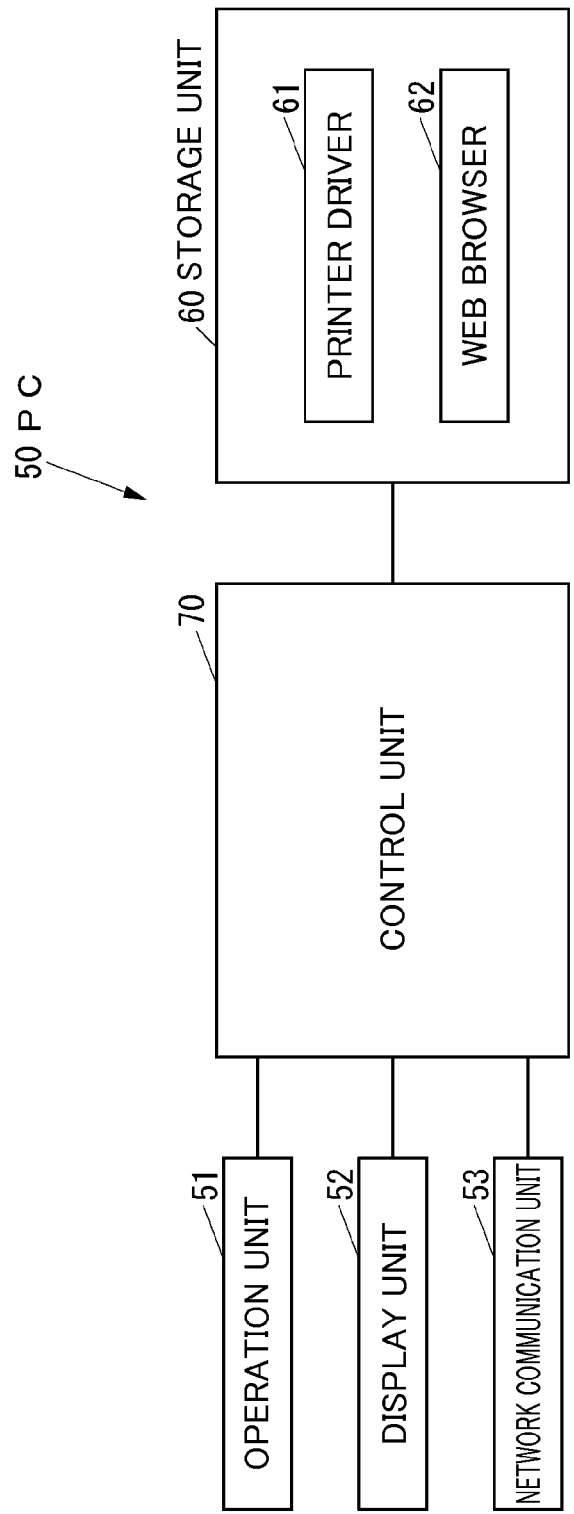
FIG. 7 is a block diagram of a PC shown in FIG. 1.

FIG. 7 is a block diagram of the PC 50. As shown in FIG. 7, the PC 50 is provided with an operation unit 51, a display unit 52, a network communication unit 53, a storage unit 60, and a control unit 70 that controls the entire PC 50. The operation unit 51 is an input device such as mouse and keyboard through which various operations by a user are input. The display unit 52 is a display device such as an LCD that displays various types of information. The network communication unit 53 is a network communication device that performs communication via the network 11. The storage unit 60 is a storage device such as a HDD (Hard Disk Drive) that stores various data.

The storage unit 60 stores a printer driver 61, which is a program for controlling printing on the MFP 20, and a Web browser 62, which is a program for browsing Web pages.

The printer driver 61 and the Web browser 62 can be: installed to the PC 50 during a manufacture process of the PC 50; installed additionally to the PC 50 from a storage medium such as USB memory, a CD (Compact Disc), and a DVD (Digital Versatile Disk); or installed additionally to the PC 50 via the network 11.

The control unit 70 is provided with, for example, a CPU, ROM that stores a program and various data in advance, and RAM that is used as a working area for the CPU. The CPU executes a program stored in the ROM or the storage unit 60.

Next, an operation of the network system 10 is described. In a case in which a status of the RAM 43 is a status shown in FIG. 3, a user can make the control unit 70 execute the Web browser 62, and then instruct the control unit 70, which executes the Web browser 62, to request transfer of the document data 44 of the MFP 20, through the operation unit 51 of the PC 50.

When instructed to request transfer of the document data 44 of the MFP 20, the control unit 70, which executes the Web browser 62, submits a request of transfer of the document data 44 to the MFP 20, by HTTP (Hyper Text Transfer Protocol) communication through the network communication unit 53.

Figure 8:
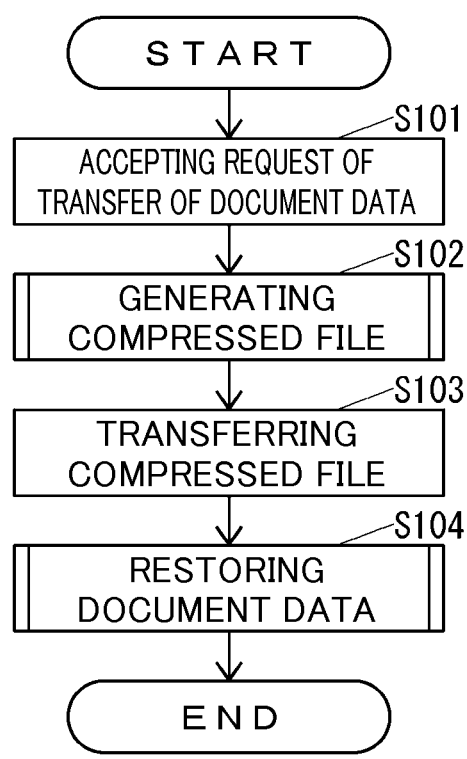
FIG. 8 is a flow chart of the MFP shown in FIG. 2 in a case of transfer of document data.

Upon reception of the request of transfer of the document data 44 submitted from the PC 50 via the network communication unit 26, the control unit 40 of the MFP 20 executes processing shown in FIG. 8.

FIG. 8 is a flow chart of an operation of the MFP 20 in a case of transfer of the document data 44. As shown in FIG. 8, the transfer request accepting unit 40*a* of the control unit 40 of the MFP 20 accepts the request of transfer of the document data 44 that is received via the network communication unit 26 (S101).

And then, the compressed file generating unit 40*b* of the control unit 40, in a case in which the request is accepted by the transfer request accepting unit 40*a*, generates the compressed file 46 (refer to FIG. 5) that stores the document data 44 on the Box region 43*a* (S102).

And then, the compressed file transferring unit 40*i* of the control unit 40 transfers the compressed file 46 generated in S102 to the PC 50 by HTTP communication via the network communication unit 26 (S103).

And then, the data restoring unit 40*j* of the control unit 40 restores the document data 44 (refer to FIG. 3) from the compressed file 46 on the Box region 43*a* (S104), and terminates the processing shown in FIG. 8.

In S103, the control unit 70 that executes the Web browser 62 can thus receive the compressed file 46 transferred from the MFP 20 via the network communication unit 53 and then expand the compressed file 46 to obtain the document data 44 in the format of the converted files 45*a* to 45*i*.

Figure 9:
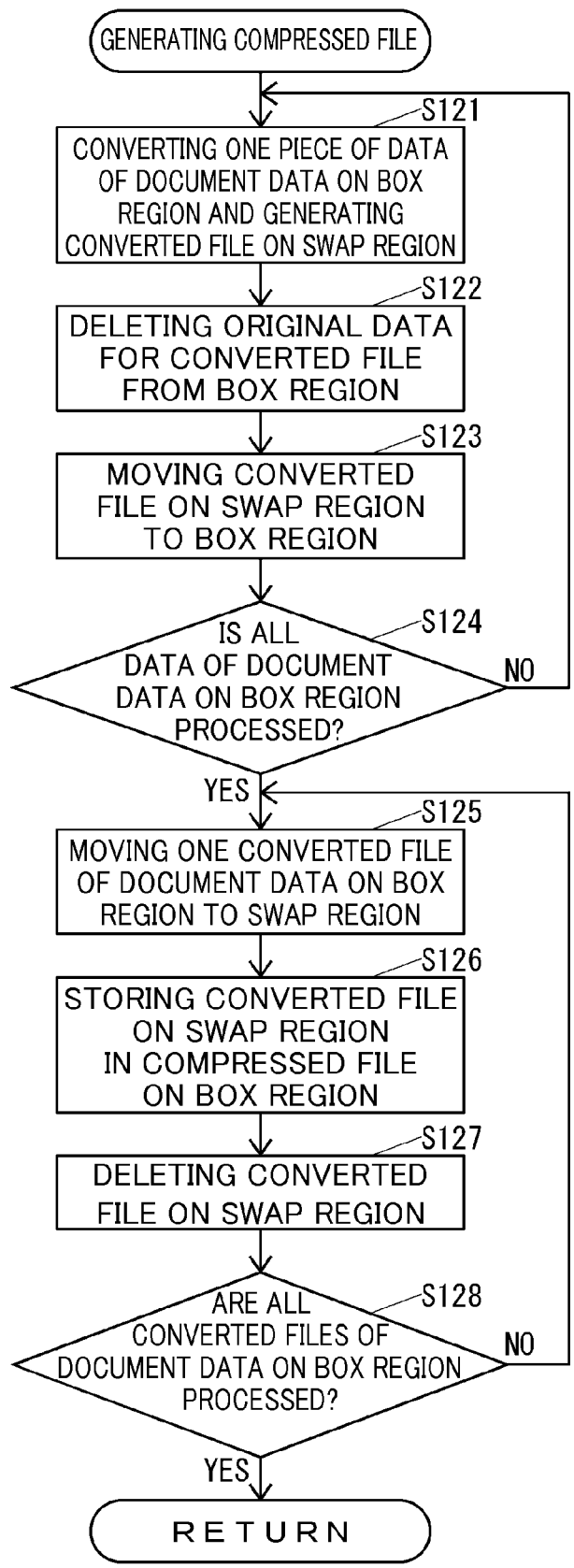
FIG. 9 is a flow chart of a process of generating the compressed file shown in FIG. 8.

FIG. 9 is a flow chart of a process of generating the compressed file 46 in S102. As shown in FIG. 9, the converted file generating unit 40*c* of the control unit 40 of the MFP 20 converts a piece of data of the document data 44 on the Box region 43*a* by lossless compression, to thereby generate a converted file on the Swap region 43*b* (S121).

Figure 10:
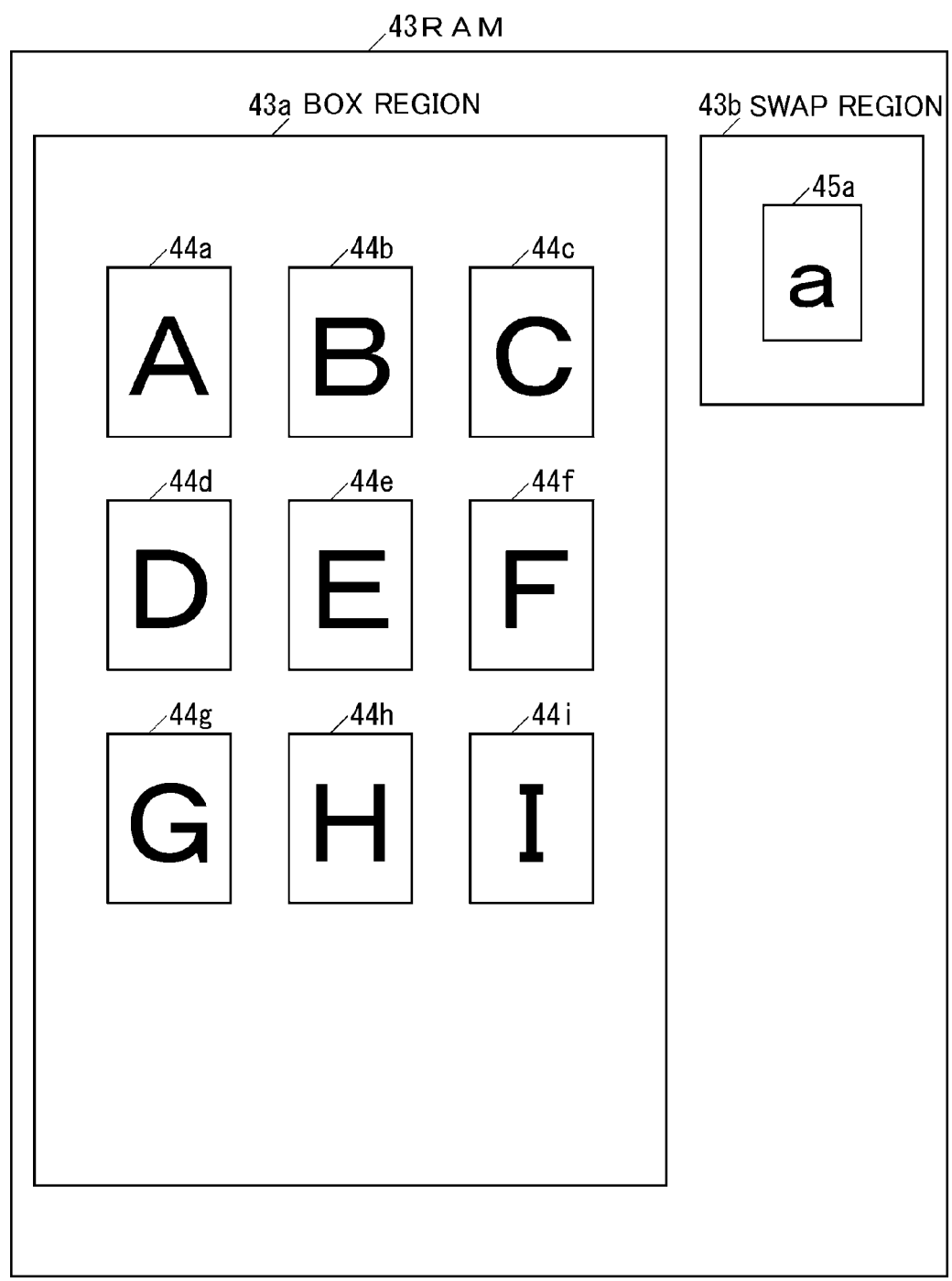
FIG. 10 is a diagram illustrating a status of the RAM shown in FIG. 2 in a case in which the converted file has been generated on a Swap region.

FIG. 10 is a diagram illustrating a status of the RAM 43 in a case in which the converted file 45*a* has been generated on the Swap region 43*b*. For example, in a case in which a status of the RAM 43 immediately before the processing of S121 is the status shown in FIG. 3, the converted file generating unit 40*c* converts a piece of data 44*a* of the document data 44 on the Box region 43*a* by lossless compression, to thereby generate the converted file 45*a* on the Swap region 43*b* in S121.

As shown in FIG. 9, after the processing of S121, the original data deleting unit 40*d* of the control unit 40 deletes the data, which is an unconverted copy of the converted file generated in S121 from the Box region 43*a* (S122).

Figure 11:
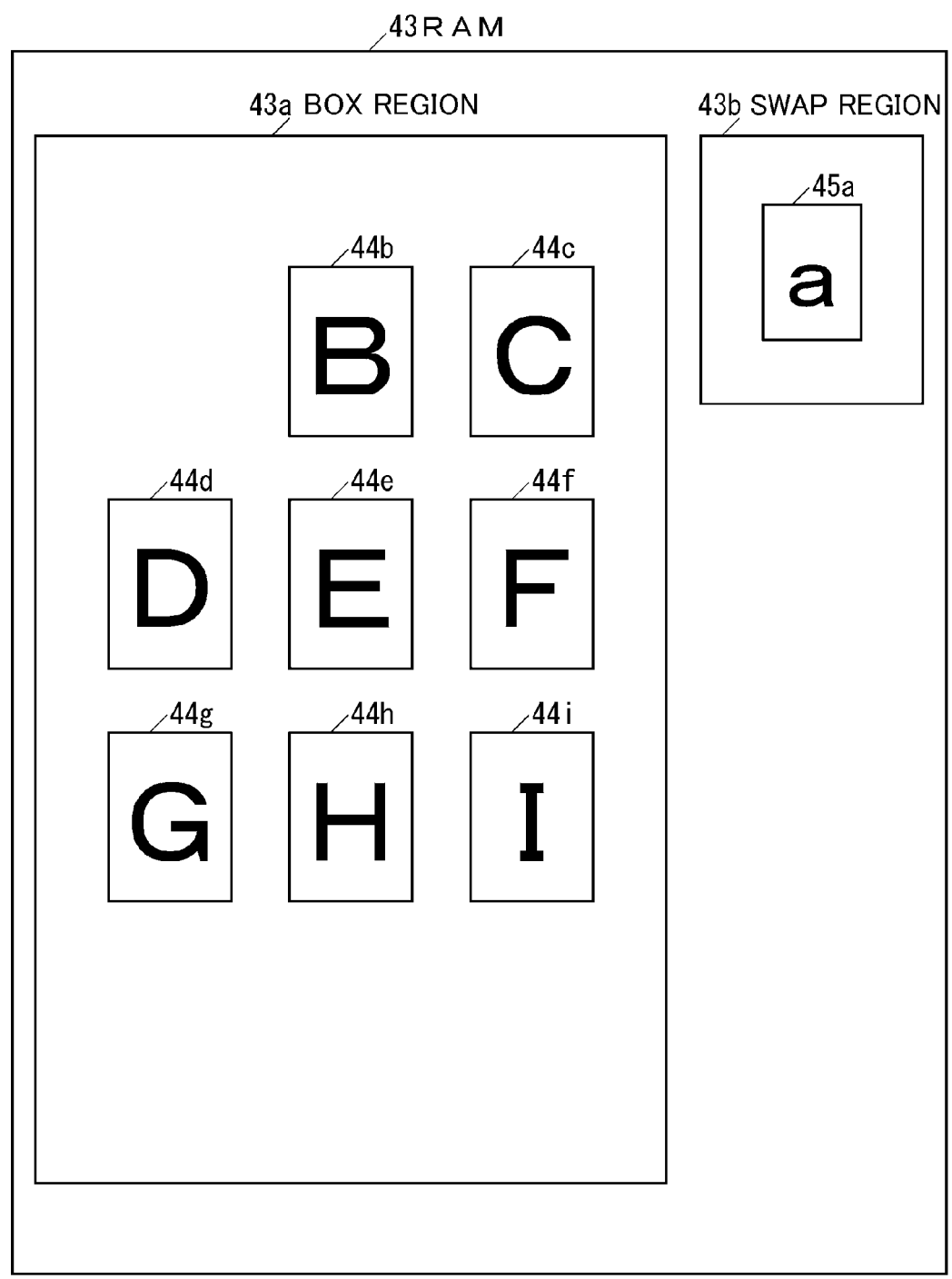
FIG. 11 is a diagram illustrating a status of the RAM shown in FIG. 2 in a case in which the data has been deleted from the Box region.

FIG. 11 is a diagram illustrating a status of the RAM 43 in a case in which the data 44*a* has been deleted from the Box region 43*a*. For example, in a case in which a status of the RAM 43 immediately before the processing of S122 is a state shown in FIG. 10, in S122, the original data deleting unit 40*d* deletes the data 44*a*, which is an unconverted copy of the converted file 45*a* generated in S121 from the Box region 43*a* as shown in FIG. 11.

As shown in FIG. 9, after the processing of S122, the upon-compression file moving unit 40*e* of the control unit 40 moves the converted file generated in S121 on the Swap region 43*b* to the Box region 43*a* (S123). As a result of this processing, no converted file is present on the Swap region 43*b*.

Figure 12:
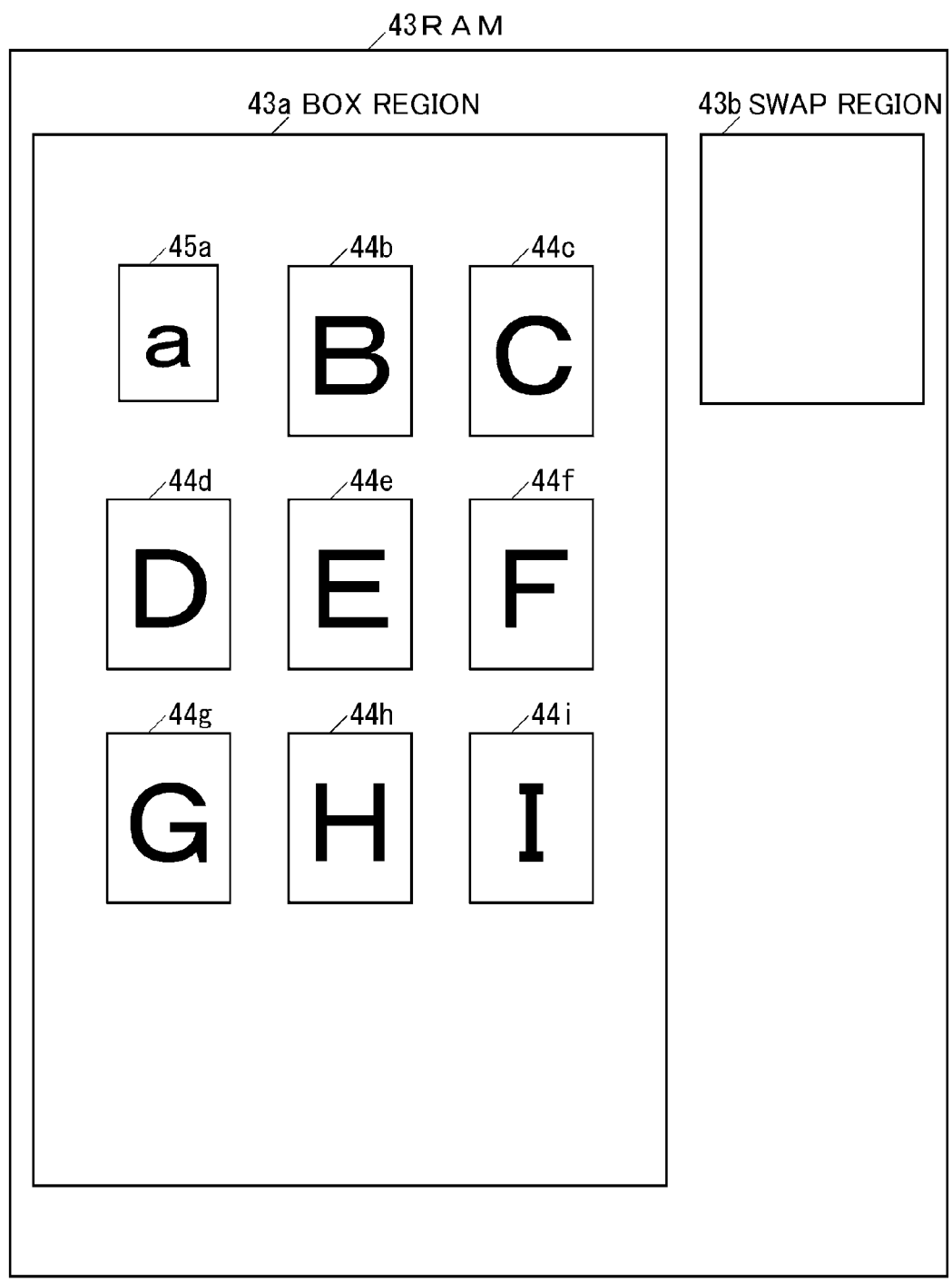
FIG. 12 is a diagram illustrating a status of the RAM shown in FIG. 2 in a case in which the converted file has been moved to the Box region upon compression.

FIG. 12 is a diagram illustrating a status of the RAM 43 in a case in which the converted file 45*a* has been moved to the Box region 43*a* upon compression. For example, in a case in which a status of the RAM 43 immediately before the processing of S123 is a state shown in FIG. 11, in S123, the upon-compression file moving unit 40*e* moves the converted file 45a generated in S121 on the Swap region 43b to the Box region 43a as shown in FIG. 12.

As shown in FIG. 9, the compressed file generating unit 40b of the control unit 40 determines whether the processing of S121 has been performed on all data of the document data 44 on the Box region 43a (S124).

In a case in which the compressed file generating unit 40b determines that the processing of S121 has not been performed on any of the data of the document data 44 on the Box region 43a in S124, the converted file generating unit 40c of the control unit 40 performs the processing of S121 on the data on which the processing of S121 has not been performed among the data of the document data 44 on the Box region 43a.

For example, in a case in which a status of the RAM 43 before the start of the processing shown in FIG. 9 is a state shown in FIG. 3, when the compressed file generating unit 40b determines that the processing of S121 has been performed on all data of the document data 44 on the Box region 43a in S124, a status of the RAM 43 is a status shown in FIG. 4, in which all of the converted files 45a to 45i of the document data 44 are stored on the Box region 43a and no converted file is present on the Swap region 43b.

As shown in FIG. 9, in a case in which the compressed file generating unit 40b determines that the processing of S121 has been performed on all data of the document data 44 on the Box region 43a in S124, the upon-compression working file moving unit 40f of the control unit 40 moves one converted file of the document data 44 on the Box region 43a to the Swap region 43b (S125).

Figure 13:
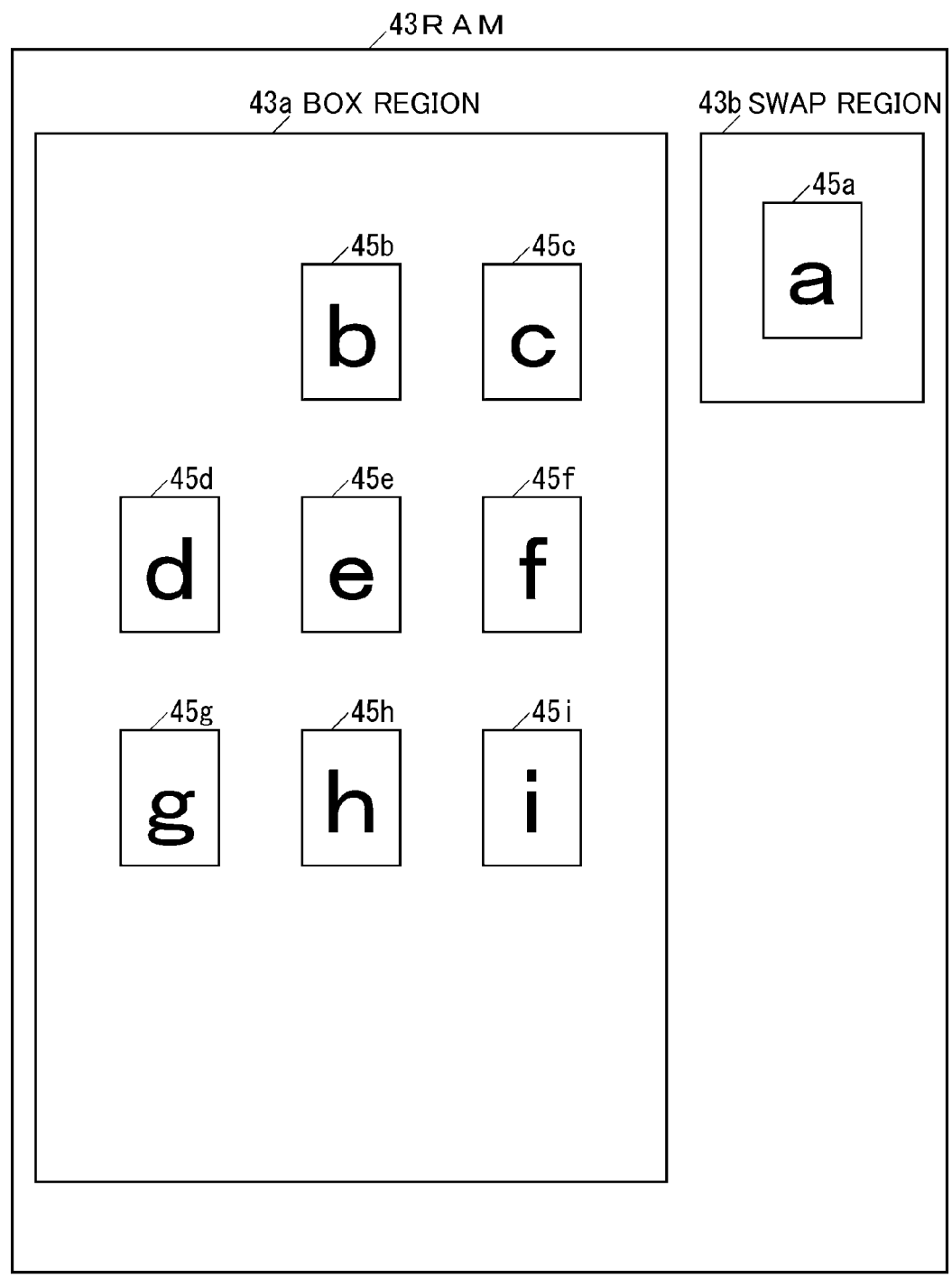
FIG. 13 is a diagram illustrating a status of the RAM shown in FIG. 2 in a case in which the converted file has been moved to the Swap region.

FIG. 13 is a diagram illustrating a status of the RAM 43 in a case in which the converted file 45a has been moved to the Swap region 43b. For example, in a case in which a status of the RAM 43 immediately before the processing of S125 is a state shown in FIG. 4, in S125, the upon-compression working file moving unit 40f moves the converted file 45a of the document data 44 on the Box region 43a to the Swap region 43b as shown in FIG. 13.

As shown in FIG. 9, the file compressing unit 40g of the control unit 40 compresses the converted file on the Swap region 43b by lossless compression by a compression library (not illustrated) and stores in the compressed file 46 on the Box region 43a (S126).

Figure 14:
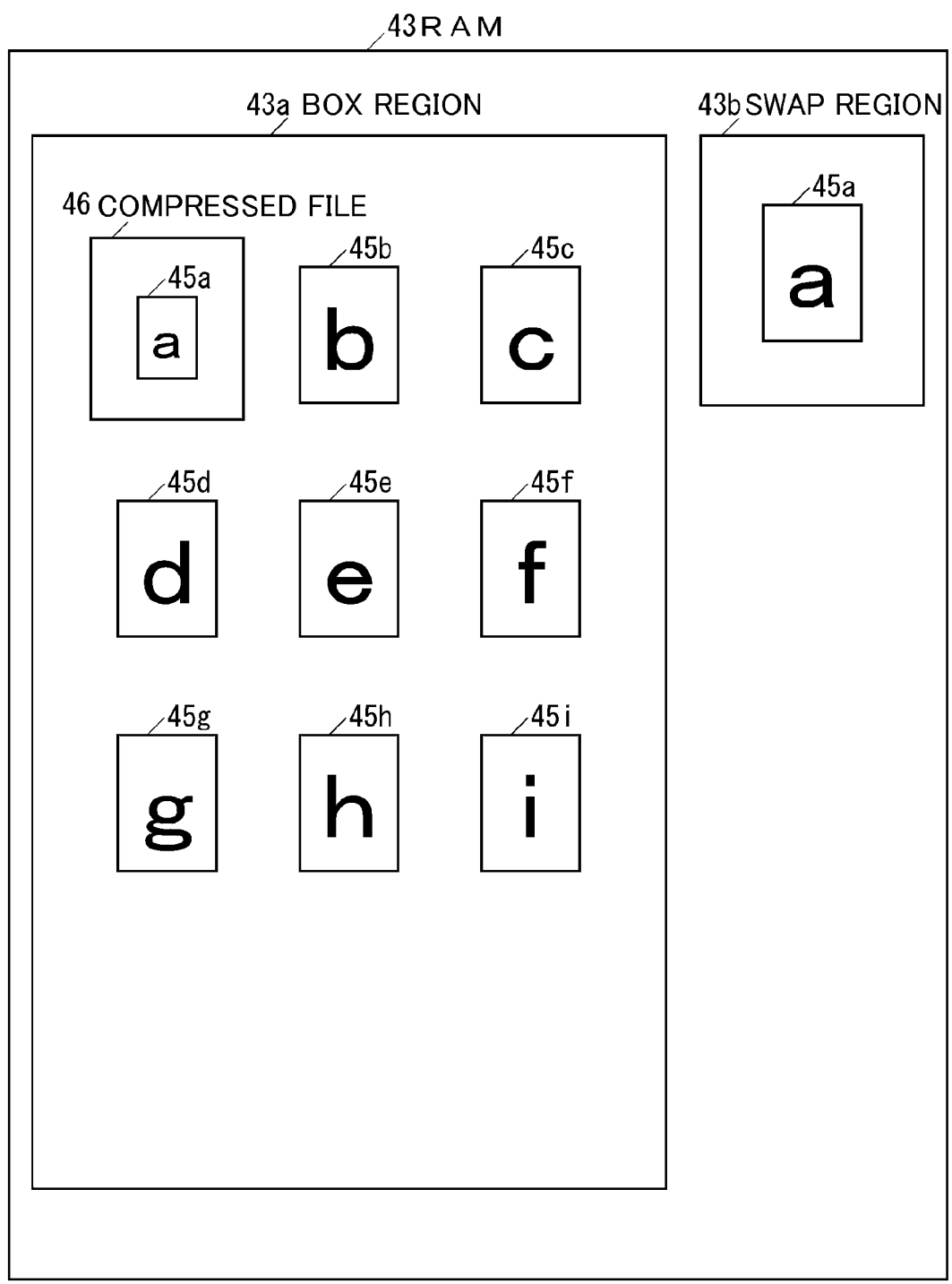
FIG. 14 is a diagram illustrating a status of the RAM shown in FIG. 2 in a case in which the converted file has been stored in the compressed file.

FIG. 14 is a diagram illustrating a status of the RAM 43 in a case in which the converted file 45a has been stored in the compressed file 46. For example, in a case in which a status of the RAM 43 immediately before the processing of S126 is a state shown in FIG. 13, in S126, the file compressing unit 40g compresses the converted file 45a on the Swap region 43b by lossless compression and stores in the compressed file 46 on the Box region 43a as shown in FIG. 14. It should be noted that, in a case of compressing the converted file on the Swap region 43b by lossless compression, when the compressed file 46 is not present on the Box region 43a, the file compressing unit 40g generates the compressed file 46 on the Box region 43a; and when the compressed file 46 is present on the Box region 43a, the file compressing unit 40g adds the compressed converted file to the compressed file 46 on the Box region 43a.

As shown in FIG. 9, the upon-compression converted file deleting unit 40h of the control unit 40 deletes the converted file, which is stored in the compressed file 46 in S126, from the Swap region 43b (S127).

Figure 15:
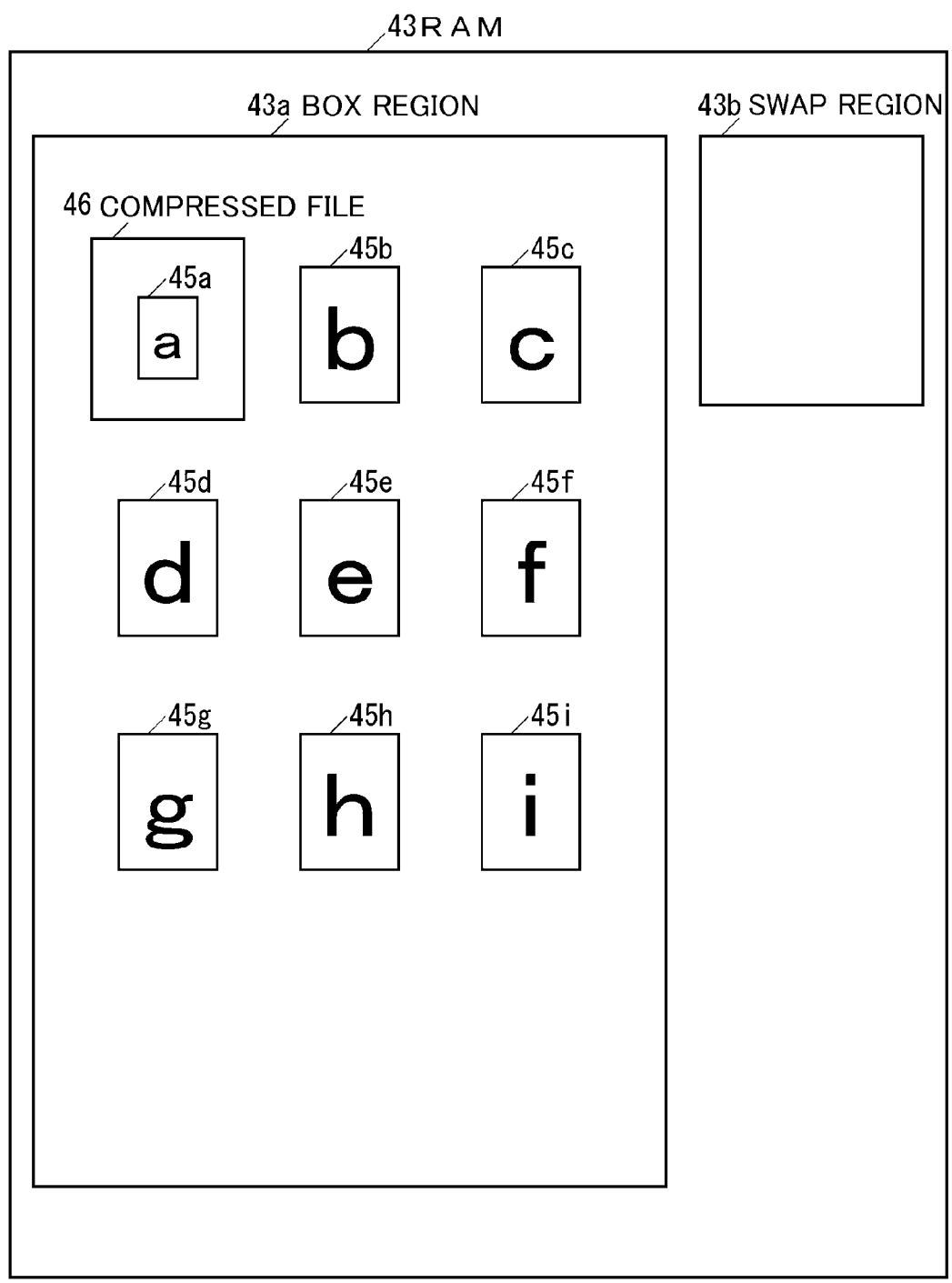
FIG. 15 is a diagram illustrating a status of the RAM shown in FIG. 2 in a case in which the converted file has been deleted from the Swap region upon compression.

FIG. 15 is a diagram illustrating a status of the RAM 43 in a case in which the converted file 45a has been deleted from the Swap region 43b upon compression. For example, in a case in which a status of the RAM 43 immediately before the processing of S127 is a state shown in FIG. 14, in S127, the upon-compression converted file deleting unit 40h deletes the converted file 45a on the Swap region 43b as shown in FIG. 15.

As shown in FIG. 9, the compressed file generating unit 40b of the control unit 40 determines whether the processing of S125 has been performed on all of the converted files of the document data 44 on the Box region 43a (S128).

In a case in which the compressed file generating unit 40b determines that the processing of S125 has not been performed on any of the converted files of the document data 44 on the Box region 43a in S128, the upon-compression working file moving unit 40f of the control unit 40 performs the processing of S125 on the data on which the processing of S125 has not been performed among the converted files of the document data 44 on the Box region 43a.

For example, in a case in which a status of the RAM 43 immediately after the end of the processing of S123 is a state shown in FIG. 4, when the compressed file generating unit 40b determines that the processing of S125 has been performed on all of the converted files of the document data 44 on the Box region 43a in S128, a status of the RAM 43 is a status shown in FIG. 5, in which the compressed file 46 storing all the converted files 45a to 45i of the document data 44 is stored on the Box region 43a.

As shown in FIG. 9, in a case in which the compressed file generating unit 40b determines that the processing of S125 has been performed on all of the converted files of the document data 44 on the Box region 43a in S128, the compressed file generating unit 40b terminates the processing shown in FIG. 9.

Figure 16:
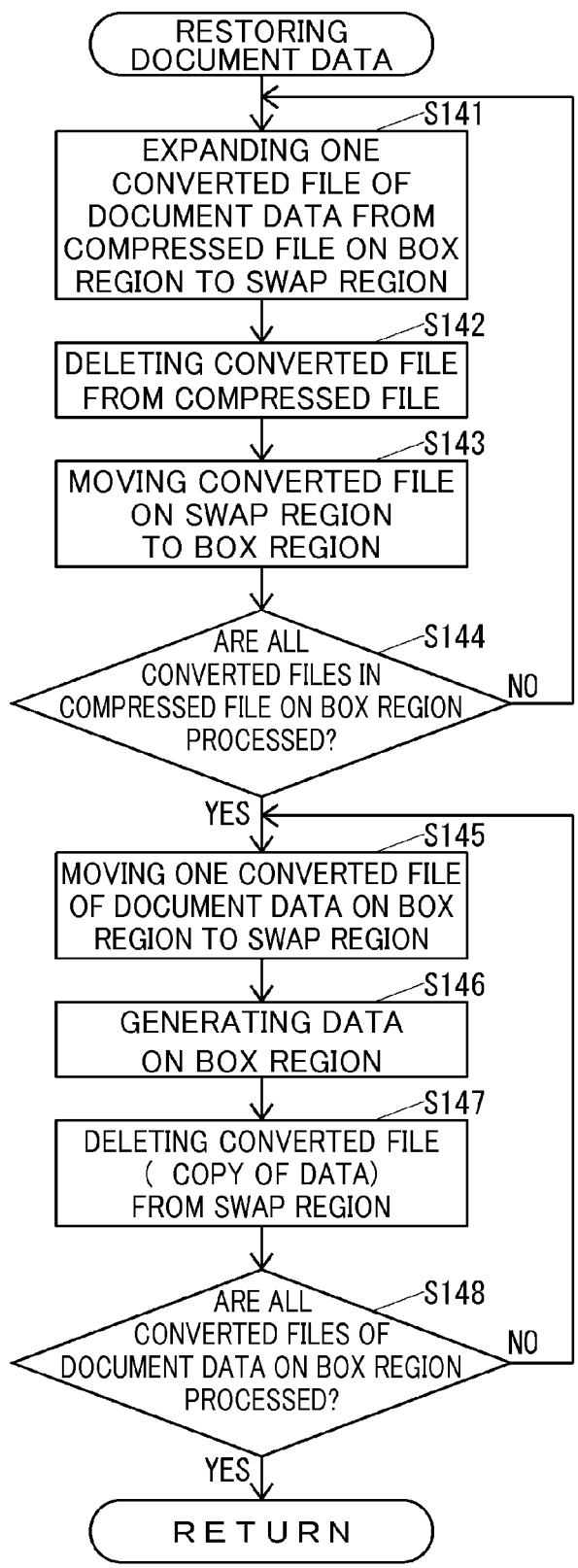
FIG. 16 is a flow chart of a process of reconstructing the document data shown in FIG. 8.

FIG. 16 is a flow chart of a process of reconstructing the document data 44 in S104. As shown in FIG. 16, the file expanding unit 40k of the control unit 40 of the MFP 20 expands one converted file of the document data 44 stored in the compressed file 46 on the Box region 43a to the Swap region 43b (S141).

Figure 17:
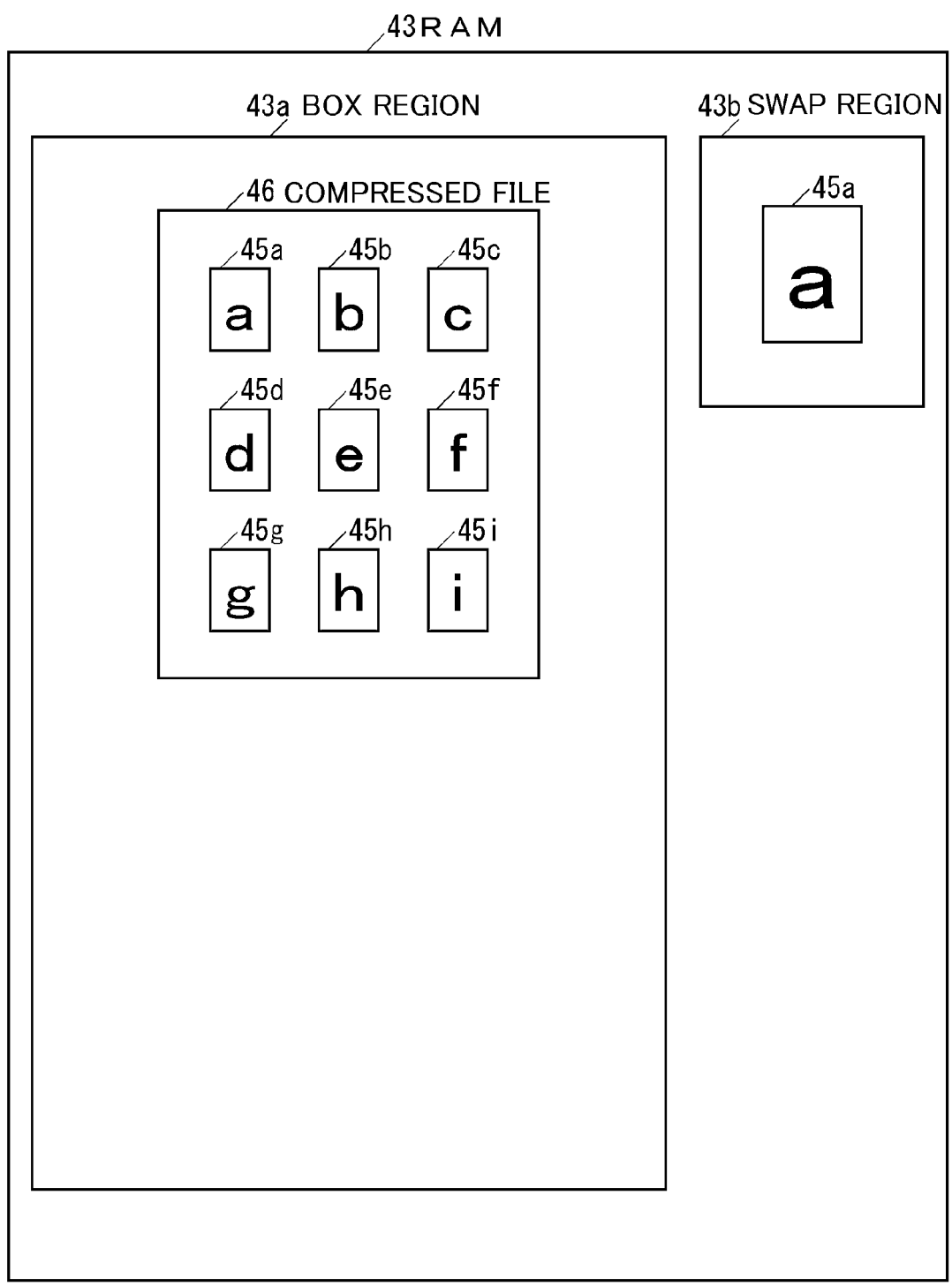
FIG. 17 is a diagram illustrating a status of the RAM shown in FIG. 2 in a case in which the converted file has been expanded to the Swap region.

FIG. 17 is a diagram illustrating a status of the RAM 43 in a case in which the converted file 45a has been expanded to the Swap region 43b. For example, in a case in which a status of the RAM 43 immediately before the processing of S141 is a state shown in FIG. 5, in S141, the file expanding unit 40k expands the converted file 45a of the document data 44 stored in the compressed file 46 on the Box region 43a to the Swap region 43b as shown in FIG. 17.

As shown in FIG. 16, after the processing of S141, the in-compressed-file file deleting unit 40l of the control unit 40 deletes the converted file that has been expanded in S141 from the compressed file 46 (S142).

Figure 18:
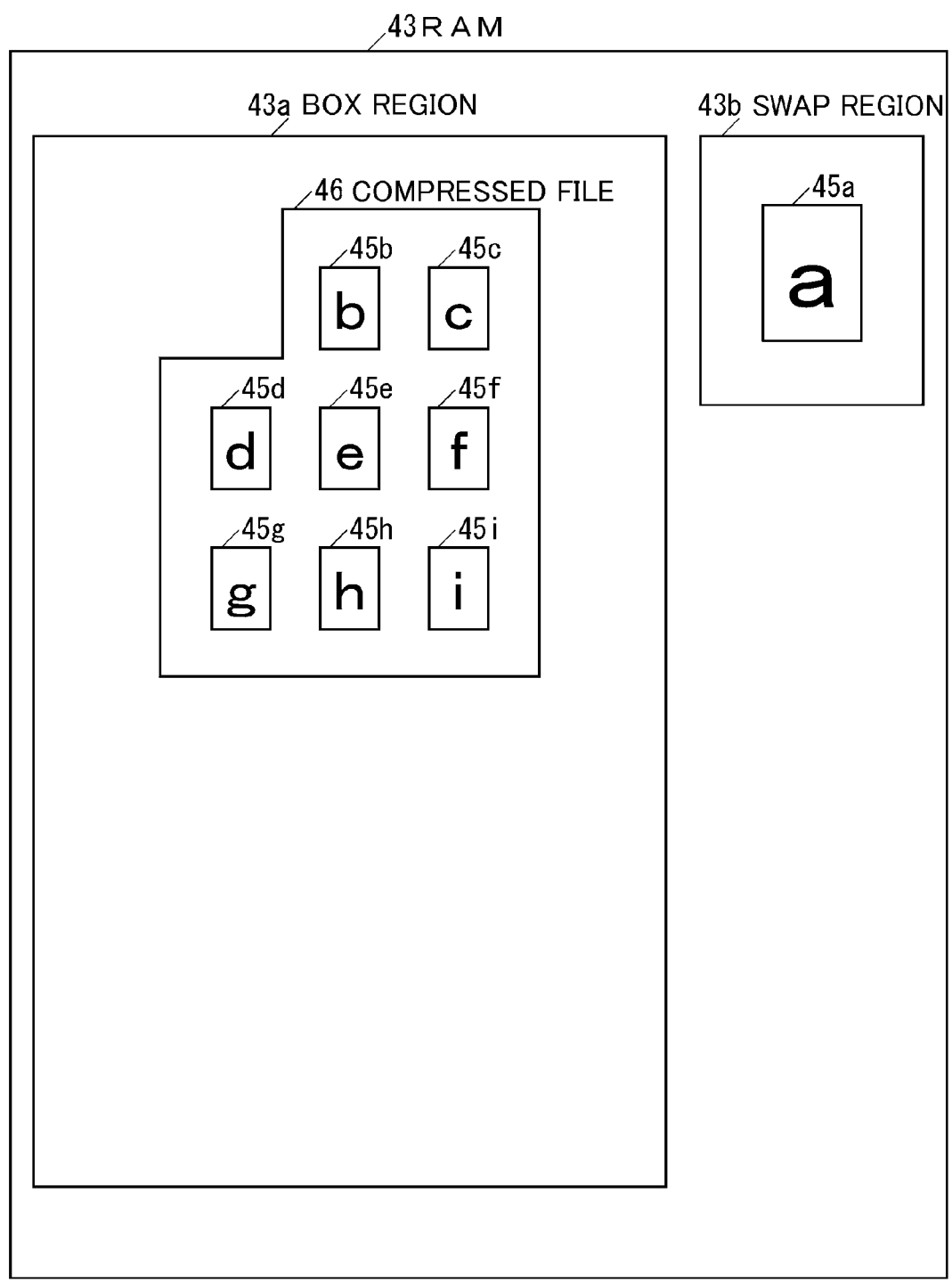
FIG. 18 is a diagram illustrating a status of the RAM shown in FIG. 2 in a case in which the converted file has been deleted from the compressed file.

FIG. 18 is a diagram illustrating a status of the RAM 43 in a case in which the converted file 45a has been deleted from the compressed file 46. For example, in a case in which a status of the RAM 43 immediately before the processing of S142 is a state shown in FIG. 17, in S142, the in-compressed-file file deleting unit 40l deletes the converted file 45a that has been expanded in S141 from the compressed file 46 as shown in FIG. 18. It should be noted that, in a case of deleting all of the converted files from the compressed file 46 on the Box region 43a, the in-compressed-file file deleting unit 40l deletes the compressed file 46 itself from the Box region 43a.

As shown in FIG. 16, after the processing of S142, the upon-restoration file moving unit 40m of the control unit 40 moves the converted file on the Swap region 43b that has been expanded in S141 to the Box region 43a (S143).

Figure 19:
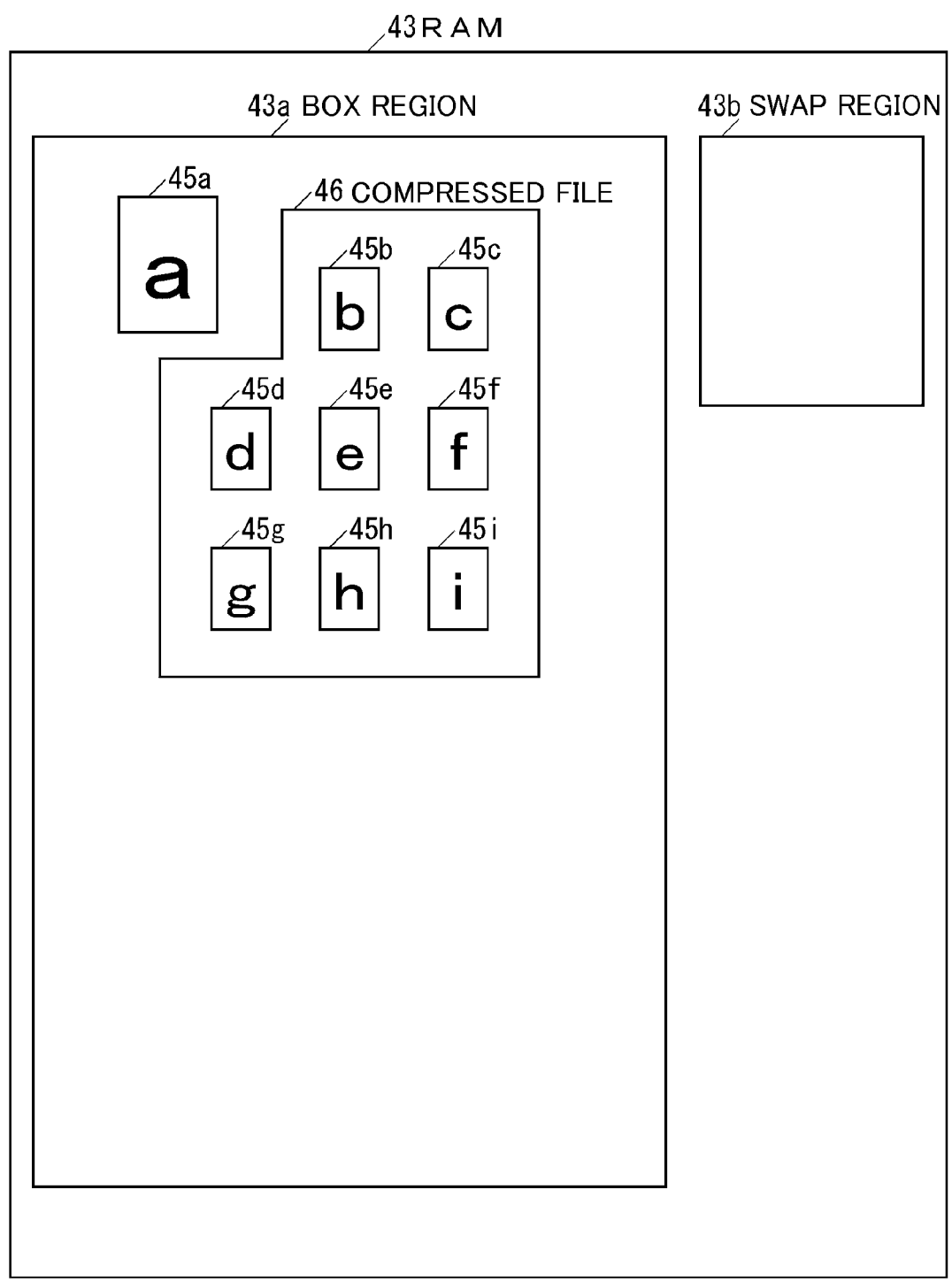
FIG. 19 is a diagram illustrating a status of the RAM shown in FIG. 2 in a case in which the converted file has been moved to the Box region upon restoration.

FIG. 19 is a diagram illustrating a status of the RAM 43 in a case in which the converted file 45a has been moved to the Box region 43a upon the restoration. For example, in a case in which a status of the RAM 43 immediately before the processing of S143 is a state shown in FIG. 18, in S143, the upon-restoration file moving unit 40*m* moves the converted file 45*a* expanded in S141 to the Box region 43*a* as shown in FIG. 19.

As shown in FIG. 16, the data restoring unit 40*j* of the control unit 40 determines whether the processing of S141 has been performed on all of the converted files in the compressed file 46 on the Box region 43*a* (S144).

In a case in which the data restoring unit 40*j* determines that the processing of S141 has not been performed on any of the converted files in the compressed file 46 on the Box region 43*a* in S144, the file expanding unit 40*k* of the control unit 40 performs the processing of S141 on the data on which the processing of S141 has not been performed among the converted files in the compressed file 46 on the Box region 43*a*.

For example, in a case in which a status of the RAM 43 before the start of the processing shown in FIG. 16 is a state shown in FIG. 5, when the data restoring unit 40*j* determines that the processing of S141 has been performed on all of the converted files in the compressed file 46 on the Box region 43*a* in S144, a status of the RAM 43 is a status shown in FIG. 4, in which all the converted files 45*a* to 45*i* of the document data 44 are stored on the Box region 43*a* and no converted file is present on the Swap region 43*b*.

As shown in FIG. 16, in a case in which the data restoring unit 40*j* determines that the processing of S141 has been performed on all of the converted files in the compressed file 46 on the Box region 43*a* in S144, the upon-restoration file moving unit 40*n* of the control unit 40 moves one converted file of the document data 44 on the Box region 43*a* to the Swap region 43*b* (S145).

For example, in a case in which a status of the RAM 43 immediately before the processing of S145 is a state shown in FIG. 4, in S145, the upon-restoration file moving unit 40*n* moves the converted file 45*a* of the document data 44 on the Box region 43*a* to the Swap region 43*b* as shown in FIG. 13.

As shown in FIG. 16, after the processing of S145, the restored data generating unit 40*o* of the control unit 40 restores the converted file on the Swap region 43*b* that has been moved in S145 and generate data on the Box region 43*a* (S146).

Figure 20:
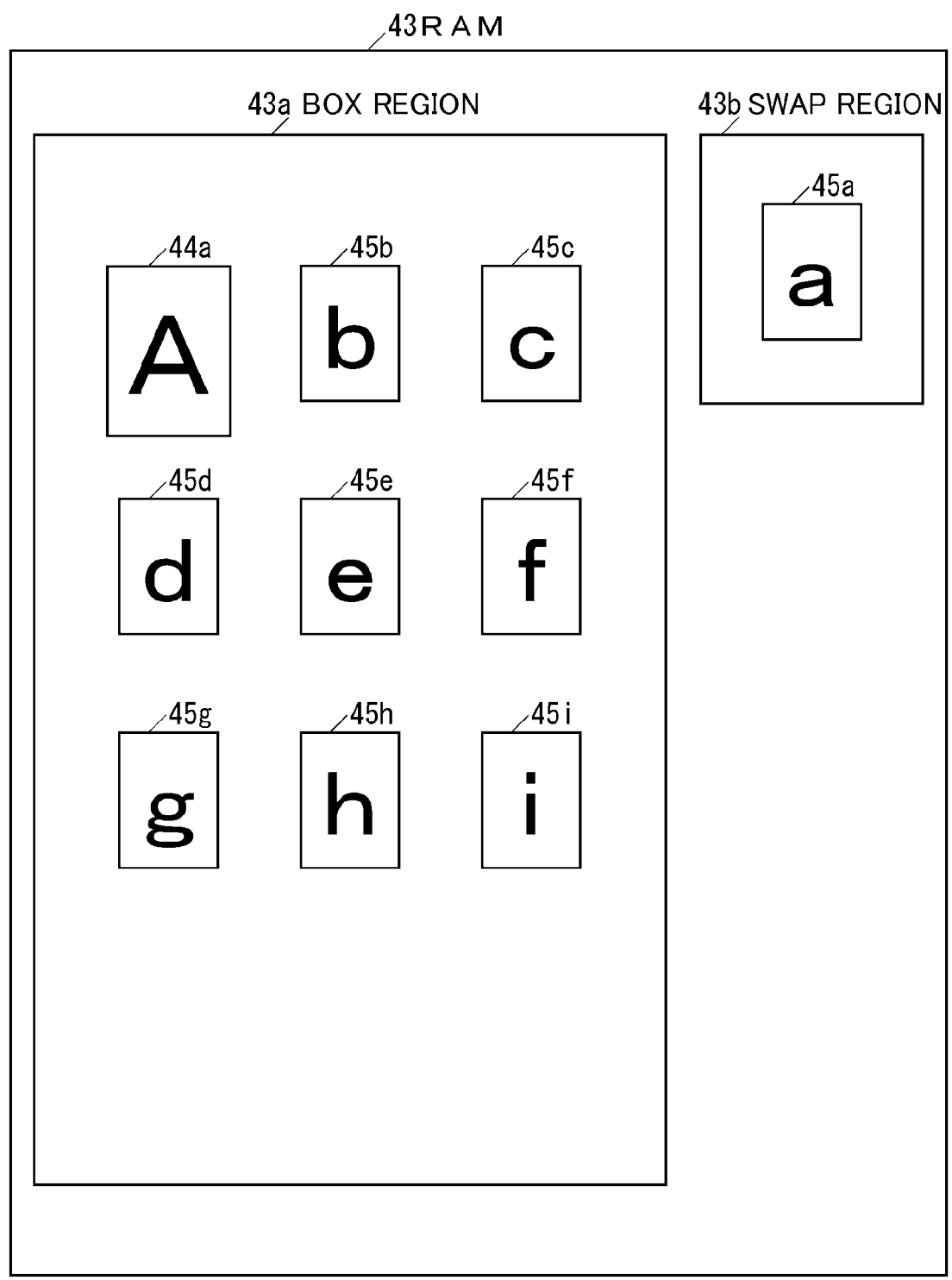
FIG. 20 is a diagram illustrating a status of the RAM shown in FIG. 2 in a case in which the data has been generated on the Box region.

FIG. 20 is a diagram illustrating a status of the RAM 43 in a case in which the data 44*a* has been generated on the Box region 43*a*. For example, in a case in which a status of the RAM 43 immediately before the processing of S146 is a state shown in FIG. 13, in S146, the restored data generating unit 40*o* restores the converted file 45*a* moved in S145 on the Swap region 43*b* and generates data 44*a* on the Box region 43*a* as shown in FIG. 20.

As shown in FIG. 16, after the processing of S146, the upon-restoration converted file deleting unit 40*p* of the control unit 40 deletes the converted file, which is an unrestored copy of the data generated in S146, from the Swap region 43*b* (S147).

Figure 21:
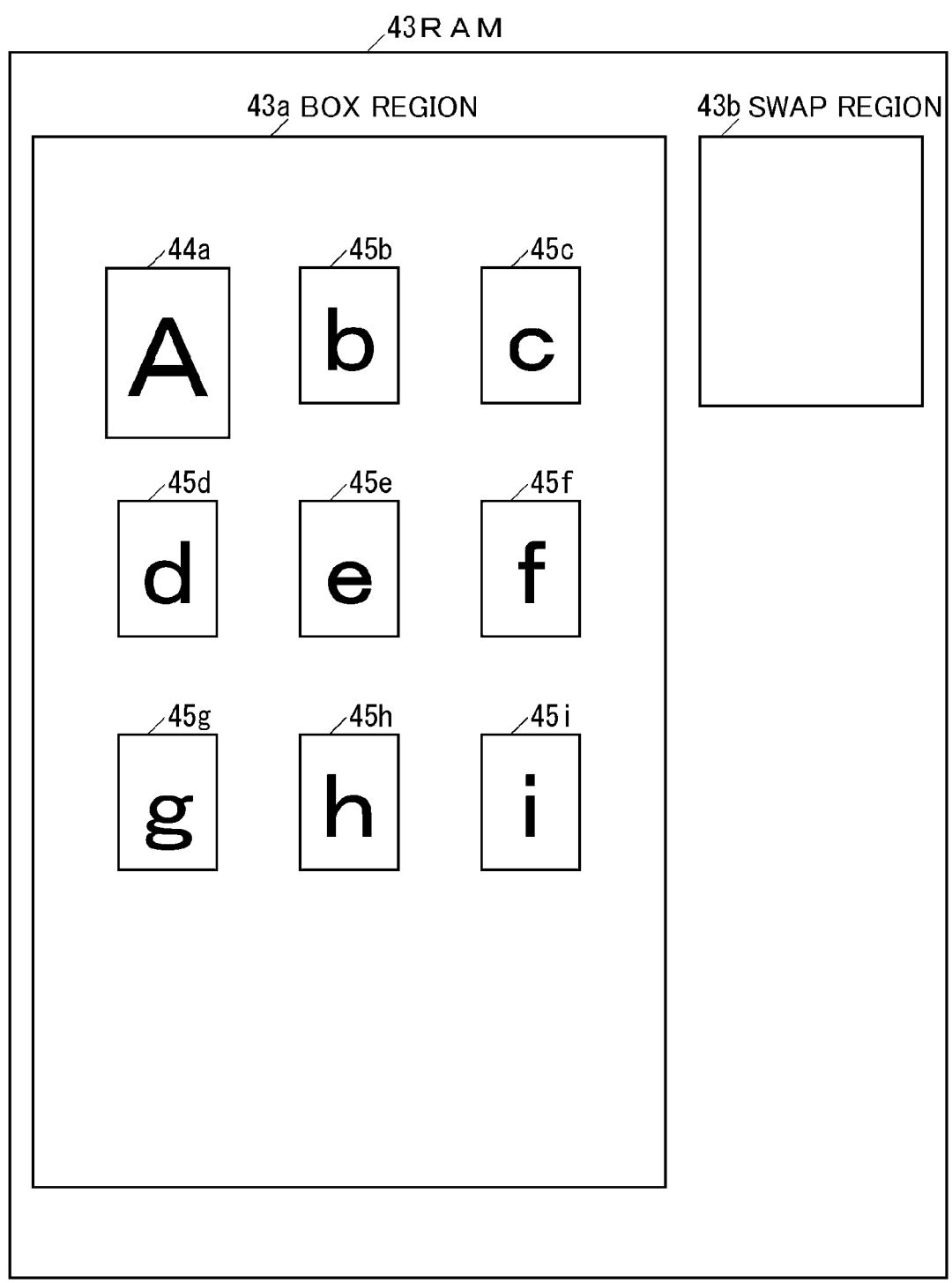
FIG. 21 is a diagram illustrating a status of the RAM shown in FIG. 2 in a case in which the converted file has been deleted from the Swap region upon restoration.

FIG. 21 is a diagram illustrating a status of the RAM 43 in a case in which the converted file 45*a* has been deleted from the Swap region 43*b* upon restoration. For example, in a case in which a status of the RAM 43 immediately before the processing of S147 is a state shown in FIG. 20, in S147, the upon-restoration converted file deleting unit 40*p* deletes the converted file 45*a*, which is an unrestored copy of the data 44*a* generated in S146, from the Swap region 43*b* as shown in FIG. 21.

As shown in FIG. 16, the data restoring unit 40*j* of the control unit 40 determines whether the processing of S145 has been performed on all of the converted files of the document data 44 on the Box region 43*a* (S148).

In a case in which the data restoring unit 40*j* determines that the processing of S145 has not been performed on any of the converted files of the document data 44 on the Box region 43*a* in S148, the upon-restoration working file moving unit 40*n* of the control unit 40 performs the processing of S145 on the data on which the processing of S145 has not been performed among the converted files of the document data 44 on the Box region 43*a*.

For example, in a case in which a status of the RAM 43 immediately after the end of the processing of S143 is a state shown in FIG. 4, when the data restoring unit 40*j* determines that the processing of S145 has been performed on all of the converted files of the document data 44 on the Box region 43*a* in S148, a status of the RAM 43 is back to an initial status shown in FIG. 3.

As shown in FIG. 16, in a case in which the data restoring unit 40*j* determines that the processing of S145 has been performed on all of the converted files of the document data 44 on the Box region 43*a* in S148, the data restoring unit 40*j* terminates the processing shown in FIG. 16.

As described above, the MFP 20 stores a plurality of converted files 45*a* to 45*i* in a single compressed file 46 (S102, S126), and transfers the compressed file 46 to the PC 50 (S103). As a result, the MFP 20 can transfer the plurality of converted files 45*a* to 45*i* to the PC 50 in a single exchange of communication between the MFP 20 and the PC 50.

In addition, the MFP 20 generates the compressed file 46 (S126) while deleting unnecessary data and converted files (S122, S123, S125, S127). As a result, the MFP 20 can transfer the plurality of converted files 45*a* to 45*i* to the PC 50 in a single exchange of communication between the MFP 20 and the PC 50, even in a configuration in which the Swap region 43*b* is small in volume. Therefore, the MFP 20 does not require a large volume storage device such as a HDD for the Swap region 43*b*.

It should be noted that, in the MFP 20, the Swap region 43*b* is only required to provide a volume allowing storage of the converted file corresponding to data of one page of the document data 44.

The MFP 20 generates the compressed file 46 on the Box region 43*a* (S126) in a state in which all of the plurality of pieces of data 44*a* to 44*i* are present as the converted files 45*a* to 45*i* on the Box region 43*a* (S124, YES). Therefore, compared to a case of generating the compressed file 46 on the Box region 43*a* before any of the plurality of pieces of data 44*a* to 44*i* is converted into the converted file, the MFP 20 can generate the compressed file 46 with more free space available on the Box region 43*a*. It should be noted that the MFP 20 can also be configured to generate the compressed file 46 on the Box region 43*a* before any of the plurality of pieces of data 44*a* to 44*i* is converted into the converted file.

The MFP 20 restores the plurality of pieces of data 44*a* to 44*i* from the compressed file 46 on the Box region 43*a* (S104, S146) in a case in which the compressed file 46 is transferred to the PC 50 (S103). As a result, the MFP 20 can restore the plurality of pieces of data 44*a* to 44*i* from the compressed file 46 after transferring the compressed file 46 to the PC 50.

It should be noted that, in the present embodiment, the MFP 20 is configured to generate data on the Box region 43*a* by restoring the converted files (S146) in a state in which all of the plurality of pieces of data 44*a* to 44*i* are present as the converted files on the Box region 43*a* (S144, YES). However, the MFP 20 can also be configured to generate data on the Box region 43*a* by restoring the converted files in a state in which any of the plurality of pieces of data 44a to 44i is present as the converted file in the compressed file.

In the MFP 20, the Box region 43a and the Swap region 43b are composed of RAM. Given this, compared to a case in which at least one of the Box region 43a and the Swap region 43b is composed of a HDD, the MFP 20 can provide faster access to the Box region 43a and the Swap region 43b. Therefore, the MFP 20 can transfer the plurality of pieces of data 44a to 44i quickly to the PC 50. It should be noted that, in the MFP 20, at least one of the Box region 43a and the Swap region 43b can be composed of a HDD.

The plurality of pieces of data 44a to 44i composes respective pages in a piece of document data 44. As a result, the MFP 20 can transfer the document data 44 consisting of a plurality of pages in a single exchange of communication between the MFP 20 and the PC 50.

It should be noted that the electronic device of the present invention is the MFP in the present embodiment; however, the electronic device is not limited thereto and can also be an electronic device other than an image forming apparatus (for example, a PC).

In addition, the file compression and transfer program to be executed by a computer can be stored (recorded) non-temporarily in a computer-readable storage medium, such as ROM and a hard disk in the computer, an external storage device, or a portable storage medium. The external storage device indicates a memory expansion device incorporating a storage medium such as a CD-ROM (Compact Disk-Read only Memory), that is externally connected to an electronic device. The portable storage medium indicates a storage medium that can be loaded into a storage medium driving device (drive device) and is portable, such as a flexible disk, a memory card, and a magneto optical disk. And then, the program stored in the storage medium is loaded onto RAM and the like of the computer and executed by a CPU (control unit). This execution realizes a function of the computer.

What is claimed is:

1. An electronic device comprising:
a data storing unit that comprises an area to store a plurality of pieces of data;
a working storing unit that comprises an area to store each piece of data on which a process associated with data compression or data expansion is executed;
a transfer request accepting unit that performs a process of accepting a request of transfer of the plurality of pieces of data;
a compressed file generating unit that performs a process of generating a compressed file that stores the plurality of pieces of data on the data storing unit in response to the request accepted by the transfer request accepting unit;
a compressed file transferring unit that performs a process of transferring the compressed file generated by the compressed file generating unit to an external device; and
a data restoring unit that performs a process of restoring the plurality of pieces of data in the compressed file on the data storing unit in a case in which the compressed file is transferred to the external device by the compressed file transferring unit,
wherein the compressed file generating unit includes:
a converted file generating unit that performs a process of converting, per processing, one of the plurality of pieces of data on the data storing unit by first lossless compression, to thereby generate a converted file on the working storing unit, the converted file generating unit performing a process of generating the converted file on the working storing in a case in which there is no converted file on the working storing unit;
an original data deleting unit that performs a process of deleting the one of the plurality of pieces of data from which the converted file is generated by the converted file generating unit, from the data storing unit;
a file compressing unit that performs a process of compressing the converted file on the working storing unit by second lossless compression and a process of storing the converted file thus compressed in the compressed file on the data storing unit after the one of the plurality of pieces of data is deleted by the original data deleting unit from the data storing unit; and
a first file deleting unit that performs a process of deleting from the working storing unit the converted file before the second lossless compression from which the converted file compressed by the second lossless compression is generated and stored in the compressed file by the file compressing unit,
wherein the data restoring unit comprises:
a file expanding unit that performs a process of expanding, per processing, one converted file of one of the plurality of pieces of data in the compressed file on the data storing unit and sending the one converted file thus expanded to the working storing unit, the file expanding unit performing the process of expanding the one converted file and sending the one converted file thus expanded to the working storing unit in a case in which there is no converted file on the working storm unit;
a second file deleting unit that performs a process of deleting the converted file before expansion, from which the one converted file expanded is generated by the file expanding unit, from the compressed file on the data storing unit;
a restored data generating unit that performs a process of generating the data on the data storing unit by restoring the converted file expanded on the working storing unit after the converted file before expansion is deleted by the second file deleting unit; and
a third file deleting unit that performs a process of deleting the converted file expanded, from which the data is restored by the restored data generating unit, from the working storing unit.

2. The electronic device according to claim 1, wherein the compressed file generating unit further comprises:
a first file moving unit that performs a process of moving the converted file on the working storing unit to the data storing unit after the data is deleted by the original data deleting unit; and
a first working file moving unit that performs a process of moving the converted file of one of the plurality of pieces of data on the data storing unit to the working storing unit after all converted files of the plurality of pieces of data are moved to the data storing unit by the first file moving unit,
wherein the file compressing unit compresses the converted files, which have been moved to the working storing unit by the first working file moving unit, by the second lossless compression and stores the converted files thus compressed in the compressed file on the data storing unit.

3. The electronic device according to claim 1, wherein the data restoring unit comprises:
a second file moving unit that performs a process of moving the converted file expanded on the working storing unit to the data storing unit after the converted file before expansion is deleted by the second file deleting unit; and a second working file moving unit that performs a process of moving the converted file of one of the plurality of pieces of data on the data storing unit to the working storing unit after all converted files of the plurality of pieces of data are moved to the data storing unit by the second file moving unit, wherein the restored data generating unit restores the converted file having been moved to the working storing unit by the second working file moving unit, and generates the data on the data storing unit.

4. The electronic device according to claim 1, wherein the data storing unit and the working storing unit are configured with RAM.

5. The electronic device according to claim 1, wherein the plurality of pieces of data composes a piece of document data, and the plurality of pieces of data composes respective pages in the document data.

6. A computer-readable non-transitory storage medium that stores a file compression and transfer program, wherein the file compression and transfer program makes a computer function as the electronic device according to claim 1.

* * * * *